United States Patent
Ono

(10) Patent No.: US 10,704,462 B2
(45) Date of Patent: Jul. 7, 2020

(54) INTERNAL COMBUSTION ENGINE CONTROL DEVICE AND CONTROL METHOD

(71) Applicant: MITSUBISHI ELECTRIC CORPORATION, Tokyo (JP)

(72) Inventor: Takahiko Ono, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/260,406

(22) Filed: Jan. 29, 2019

(65) Prior Publication Data
US 2019/0345869 A1    Nov. 14, 2019

(30) Foreign Application Priority Data
May 11, 2018    (JP) .................................. 2018-091833

(51) Int. Cl.
| | | |
|---|---|---|
| F02B 37/18 | (2006.01) | |
| F02D 41/00 | (2006.01) | |
| F02D 23/00 | (2006.01) | |
| F02D 41/22 | (2006.01) | |
| F02D 41/24 | (2006.01) | |
| F02D 41/20 | (2006.01) | |

(52) U.S. Cl.
CPC ............ *F02B 37/186* (2013.01); *F02D 23/00* (2013.01); *F02D 41/0007* (2013.01); *F02D 41/221* (2013.01); *F02D 41/2464* (2013.01); F02D 2041/2048 (2013.01); F02D 2200/0406 (2013.01)

(58) Field of Classification Search
CPC . F02B 37/18–186; F02D 41/22; F02D 41/221
See application file for complete search history.

(56) References Cited

U.S. PATENT DOCUMENTS

| | | | | |
|---|---|---|---|---|
| 2014/0060041 | A1* | 3/2014 | Makino | .................. F02B 37/18 60/602 |
| 2016/0108803 | A1* | 4/2016 | Ono | ..................... F02D 41/221 60/602 |
| 2017/0184012 | A1 | 6/2017 | Maruo et al. | |
| 2017/0184013 | A1* | 6/2017 | Ono | ....................... F02B 37/18 |

(Continued)

FOREIGN PATENT DOCUMENTS

| | | |
|---|---|---|
| JP | 6038271 B1 | 12/2016 |
| JP | 6090215 B2 | 3/2017 |

*Primary Examiner* — Laert Dounis
(74) *Attorney, Agent, or Firm* — Sughrue Mion, PLLC; Richard C. Turner

(57) ABSTRACT

While an actuator is driven by an actuator driving unit with an operation amount for which the maximum value is limited by an operation amount limitation unit, if a state in which the actual opening degree of a wastegate valve does not coincide with a target opening degree has continued for a predetermined time period, driving by the actuator driving unit is attempted with an operation amount for which the maximum value limitation is relaxed by an operation amount limitation relaxing unit. Even after this, if the state in which the actual opening degree of the wastegate valve does not coincide with the target opening degree still has not been eliminated, an abnormality determination unit determines that abnormality has occurred in an opening degree control system for the wastegate valve.

7 Claims, 12 Drawing Sheets

(56) References Cited

U.S. PATENT DOCUMENTS

2017/0306834 A1* 10/2017 Takahashi ............... F02B 37/18
2018/0100455 A1* 4/2018 Takahashi ........... F02D 41/2464
2018/0119607 A1* 5/2018 Ono ..................... F02B 37/186
2019/0345869 A1* 11/2019 Ono ..................... F02D 41/0007

* cited by examiner

INTERNAL COMBUSTION ENGINE CONTROL DEVICE AND CONTROL METHOD

BACKGROUND OF THE INVENTION

1. Field of the Invention

The present disclosure relates to a control device and a control method for an internal combustion engine provided with a turbocharger, in which the opening degree of a wastegate valve is adjusted by an actuator.

2. Description of the Background Art

A turbocharger is a device that rotates a turbine using energy of exhaust gas discharged from an internal combustion engine, whereby a compressor connected with the turbine rotates and air sucked by the internal combustion engine is compressed, and output of the internal combustion engine can be improved by the supercharging effect of the sucked air.

Normally, the internal combustion engine provided with the turbocharger has an exhaust bypass passage communicating the upstream side and the downstream side of the turbine with each other, and a wastegate valve for adjusting the flow rate of exhaust gas flowing through the exhaust bypass passage.

The wastegate valve is connected to an actuator via a link mechanism, and the opening degree of the wastegate valve can be adjusted by the actuator being driven. During operation of the internal combustion engine, if the opening degree of the wastegate valve is changed, the flow rate of exhaust gas flowing through the exhaust bypass passage changes and the flow rate of exhaust gas flowing through the turbine changes. If the flow rate of the exhaust gas flowing through the turbine changes, the rotation speed of the turbine changes and the rotation speed of the compressor rotating integrally with the turbine changes. If the rotation speed of the compressor changes, the boost pressure which is the pressure of sucked air compressed by the compressor, changes.

In order to control the above boost pressure to a desired pressure, the following control is generally performed. First, an optimum boost pressure in accordance with the operation state of the internal combustion engine is determined as a required boost pressure, and next, the opening degree of the wastegate valve for achieving the required boost pressure is calculated as a target opening degree. Then, an actual opening degree of the wastegate valve is calculated from an actuated position of the wastegate valve detected by a wastegate valve opening degree sensor, and driving of the actuator is subjected to feedback control so that the actual opening degree coincides with the target opening degree. Similar control methods are disclosed also in Patent Document 1 and Patent Document 2 described later.

Adopting feedback control to an opening degree control system for the wastegate valve has, for example, the following advantages. When an opening degree deviation between the actual opening degree and the target opening degree is great, a great feedback correction amount is calculated, whereby the operation amount for driving the actuator can be increased and thus the follow-up property of the actual opening degree to the target opening degree can be improved. In addition, when a deviation between the actual opening degree and the target opening degree is small, a small feedback correction amount is calculated, whereby variation in the operation amount for driving the actuator can be reduced and thus stability of the actual opening degree with respect to the target opening degree is improved.

However, in the case where abnormality occurs in the opening degree control system for the wastegate valve in which the feedback control is adopted, and a phenomenon occurs in which, for example, the wastegate valve opening degree sensor outputs only a constant value (the detected value no longer changes), it is difficult to cause the actual opening degree to coincide with the target opening degree. In such a case, a state in which the opening degree deviation between the actual opening degree and the target opening degree is not eliminated continues. As a result, the feedback correction amount increases, and the operation amount for driving the actuator is expected to stay at the maximum value. If such a state continues beyond a permissible time period, excessive current continues to flow through a motor mounted in the actuator, and this can cause overheat and lead to breakage.

Accordingly, Patent Document 1 discloses a failure detection method for determining that abnormality occurs in the opening degree control system for the wastegate valve, on the basis of several determination conditions including at least a condition that the operation amount for driving the actuator continues being a great value equal to or greater than a predetermined value.

A turbine part of the turbocharger is located at an exhaust passage near an exhaust manifold of the internal combustion engine. Therefore, it is known that, if the internal combustion engine is driven at a high load, the temperature becomes high and a housing member of the turbine or the wastegate valve thermally expands, so that the fully-closed position of the wastegate valve changes. Then, in a state in which the control device has not detected that the fully-closed position of the wastegate valve has changed due to the above thermal expansion, if the target opening degree is set at a value close to the fully-closed position, the wastegate valve reaches the true fully-closed position before the actual opening degree calculated on the basis of the actuated position of the wastegate valve detected by the wastegate valve opening degree sensor coincides with the target opening degree, and therefore it is difficult to cause the actual opening degree to coincide with the target opening degree.

If such a case occurs, the deviation between the actual opening degree and the target opening degree is not eliminated and therefore the feedback correction amount continues to increase, and thus the operation amount for driving the actuator is expected to stay at the maximum value. If such a state continues beyond a permissible time period, excessive current continues to flow through the motor mounted in the actuator, and this can cause overheat and lead to breakage.

Accordingly, Patent Document 2 (invention of claim 5 or claim 7) discloses a coping method in which the maximum operation amount for the actuator is limited in advance by such a limit value that does not cause damage to the actuator even if the operation amount of the actuator successively continues to be supplied beyond the permissible time period, thereby preventing overheat.

In detection of failure of the internal combustion engine, it is necessary to reliably detect occurrence of abnormality without causing erroneous determination. The same applies also in the case of adopting the failure detection method disclosed in Patent Document 1, and a certain length of determination time period is needed for reliably detecting occurrence of abnormality. However, also during this period, the operation amount for driving the actuator is expected to stay at the maximum value, and if such a state continues beyond the permissible time period, excessive current continues to flow through the motor mounted in the actuator, and this can cause overheat and lead to breakage.

Therefore, in the case of attempting to prevent occurrence of overheat while adopting the failure detection method disclosed in Patent Document 1, it is desirable to combine an overheat measure such as limitation of the maximum operation amount as disclosed in Patent Document 2.

Patent Document 1: Japanese Patent No. 6090215
Patent Document 2: Japanese Patent No. 6038271

If it is determined that abnormality has occurred in the opening degree control system for the wastegate valve, it becomes difficult to continue normal boost pressure control. Therefore, if such abnormality is detected, generally, fail-safe control prepared in advance is activated to switch to a retreat operation mode. The purpose of the fail-safe control is to prevent failure or abnormality from secondarily occurring due to the cause of the first failure, and in some cases, there is no choice but to perform a retreat operation in which the operation performance of a vehicle to which the internal combustion engine is mounted is intentionally reduced. Therefore, switching to the retreat operation mode must be performed only when it is ensured that failure has occurred.

As described above, if a phenomenon in which the wastegate valve opening degree sensor outputs only a constant value (the detected value no longer changes) occurs, a state in which the opening degree deviation between the actual opening degree and the target opening degree is not eliminated continues, whereby the feedback correction amount increases and the operation amount for driving the actuator stays at the maximum value. Examples of causes of such abnormality are as follows.

(1) Case where mechanical or electrical failure such as adhesion of the wastegate valve or output abnormality of the wastegate valve opening degree sensor has occurred (2) Case where the target opening degree is set at a value close to the fully-closed position in a state in which the control device has not detected that the fully-closed position of the wastegate valve has changed, though this is not at such a level as to be defined as failure (3) Case where, due to adherence of a foreign material to a link mechanism connecting the wastegate valve and the actuator, distortion of a movable member, or the like, the frictional resistance of the link mechanism increases and thus the follow-up property of the actual opening degree to the target opening degree is significantly reduced In the situation of the above (3), depending on the degree of reduction in the follow-up property, in a slight case, if the driving force of the actuator is increased, the driving force of the actuator surpasses the frictional resistance and the wastegate valve starts to move, whereby the abnormal situation might be solved.

However, in the conventional technology, for the overheat measures, limitation is made in advance so that the maximum value of the operation amount does not increase beyond a predetermined value. Therefore, even if the situation of the above (3) occurs, the operation amount cannot be increased beyond the limit value, and thus there is a problem that, even though the situation could be recovered, determination that abnormality has occurred is easily reached and the fail-safe control is activated, whereby the operation mode is switched to the retreat operation mode.

SUMMARY OF THE INVENTION

The present disclosure has been made to solve the above problem, and an object of the present disclosure is to obtain an internal combustion engine control device and an internal combustion engine control method that suppress such an event as to easily reach determination that abnormality has occurred even though the situation could be recovered by increasing the driving force of the actuator.

An internal combustion engine control device according to the present disclosure is a control device for an internal combustion engine that includes: a turbocharger having a turbine provided to an exhaust passage of the internal combustion engine, and a compressor which is provided to an intake passage of the internal combustion engine and rotates integrally with the turbine; a wastegate valve which is provided to an exhaust bypass passage communicating an upstream side and a downstream side of the turbine with each other and adjusts a flow rate of exhaust gas flowing through the exhaust bypass passage; and an actuator which is connected with the wastegate valve and is driven for changing an actuated position of the wastegate valve, the control device including: a target opening degree calculation unit configured to calculate a target opening degree for the wastegate valve on the basis of an operation state of the internal combustion engine; an actual opening degree calculation unit configured to calculate an actual opening degree of the wastegate valve on the basis of the actuated position of the wastegate valve; an operation amount calculation unit configured to calculate an operation amount for driving the actuator, on the basis of the target opening degree and the actual opening degree; an actuator driving unit configured to drive the actuator on the basis of the operation amount; an operation amount limitation unit configured to limit a maximum value of the operation amount to a predetermined value or lower; an operation amount limitation relaxing unit configured to relax the maximum value limitation for the operation amount if a state in which the actual opening degree does not coincide with the target opening degree has continued for a predetermined time period while the actuator is driven on the basis of the operation amount limited to the predetermined value or lower; and an abnormality determination unit configured to determine that abnormality has occurred in an opening degree control system for the wastegate valve if the state in which the actual opening degree does not coincide with the target opening degree has not been eliminated even though the maximum value limitation for the operation amount is relaxed.

An internal combustion engine control method according to the present disclosure is a control method for an internal combustion engine that includes: a turbocharger having a turbine provided to an exhaust passage of the internal combustion engine, and a compressor which is provided to an intake passage of the internal combustion engine and rotates integrally with the turbine; a wastegate valve which is provided to an exhaust bypass passage communicating an upstream side and a downstream side of the turbine with each other and adjusts a flow rate of exhaust gas flowing through the exhaust bypass passage; and an actuator which is connected with the wastegate valve and is driven for changing an actuated position of the wastegate valve, the control method executing: a target opening degree calculation step of calculating a target opening degree for the wastegate valve on the basis of an operation state of the internal combustion engine; an actual opening degree calculation step of calculating an actual opening degree of the wastegate valve on the basis of the actuated position of the wastegate valve; an operation amount calculation step of calculating an operation amount for driving the actuator, on the basis of the target opening degree and the actual opening degree; an actuator driving step of driving the actuator on the basis of the operation amount; an operation amount limitation step of limiting a maximum value of the operation amount to a predetermined value or lower; an operation amount limitation relaxing step of relaxing the maximum value limitation for the operation amount if a state in which the actual opening degree does not coincide with the target opening degree has continued for a predetermined time period while the actuator is driven on the basis of the operation amount limited to the predetermined value or lower; and an abnormality determination step of determining that abnormality has occurred in an opening degree control system for the wastegate valve if the state in which the actual opening degree does not coincide with the target opening degree has not been eliminated even though the maximum value limitation for the operation amount is relaxed.

The internal combustion engine control device and the internal combustion engine control method according to the present disclosure can suppress such an event that, in the case where the follow-up property of the actual opening degree to the target opening degree is significantly reduced due to, for example, increase in the frictional resistance at the part where the wastegate valve and the actuator are connected, determination that abnormality has occurred is easily reached even though the situation could be recovered to a normal state by relaxing the maximum value limitation for the operation amount.

DETAILED DESCRIPTION OF THE PREFERRED EMBODIMENTS OF THE INVENTION

First Embodiment

Hereinafter, a control device for an internal combustion engine according to the first embodiment of the present disclosure will be described with reference to FIG. 1 to FIG. 13.

Figure 1:
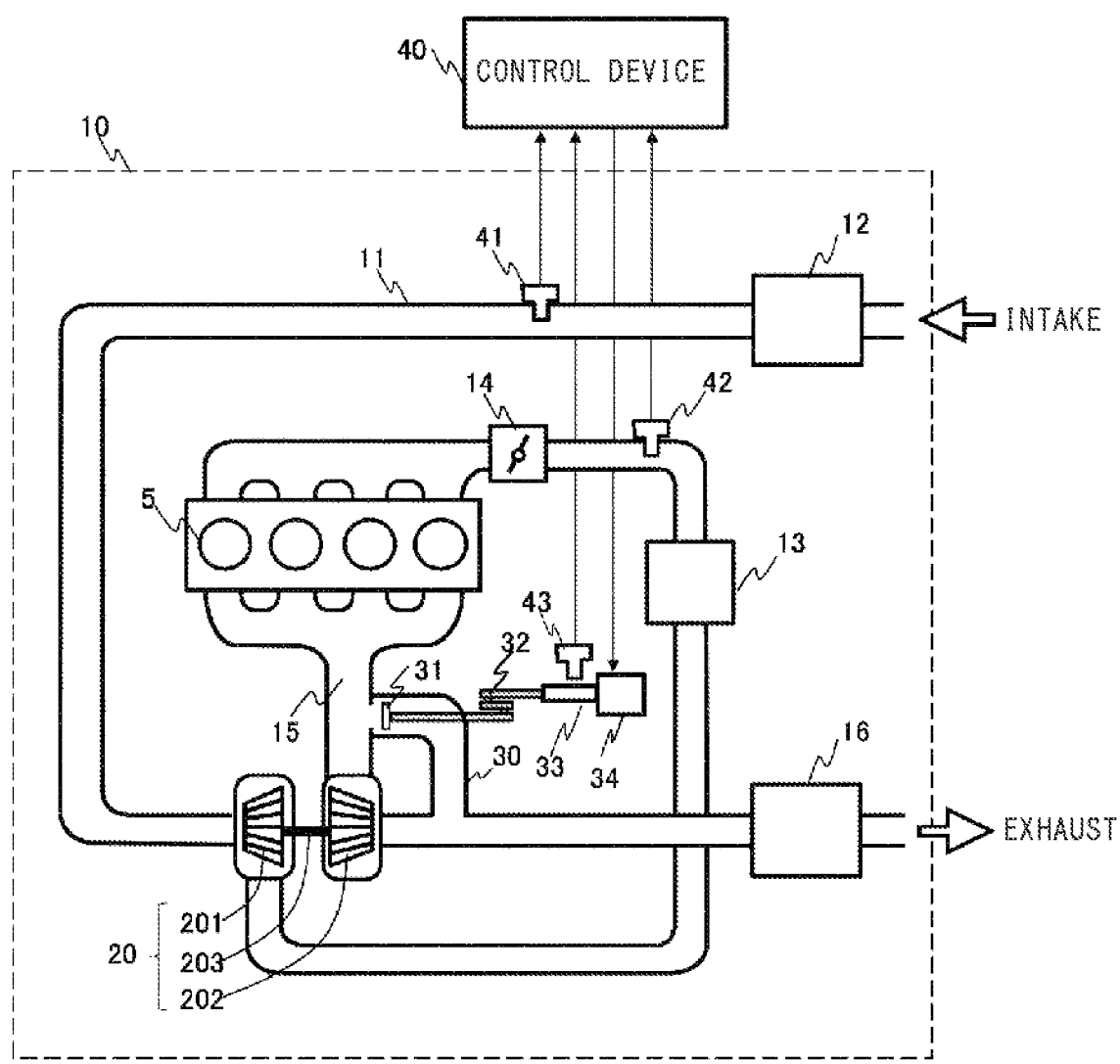
FIG. 1 is a schematic configuration diagram of an internal combustion engine and a control device according to the first embodiment.

FIG. 1 is a schematic configuration diagram of the control device for the internal combustion engine according to the first embodiment. An internal combustion engine 10 includes a plurality of cylinders 5 for combusting a mixture of air and fuel, and an intake passage 11 for supplying the air to the cylinders 5. At the entrance of the intake passage 11 of the internal combustion engine 10, an air cleaner 12 is attached. An air flow sensor 41 for detecting the amount of sucked air is provided to the intake passage 11 on the downstream side of the air cleaner 12.

A compressor 201 of a turbocharger 20 is provided to the intake passage 11 on the downstream side of the air flow sensor 41. The compressor 201 and a turbine 202 of the turbocharger 20 are connected via a connection shaft 203, and the compressor 201 is rotationally driven integrally by energy of exhaust gas inputted to the turbine 202. An intercooler 13 for cooling compressed air is provided to the intake passage 11 on the further downstream side of the compressor 201. A throttle valve 14 is provided to the intake passage 11 on the further downstream side of the intercooler 13.

Between the intercooler 13 and the throttle valve 14, a boost pressure sensor 42 is provided which outputs an electric signal in accordance with a boost pressure which is the pressure of sucked air compressed by the compressor 201. The intake passage 11 on the downstream side of the throttle valve 14 is formed to be an intake manifold for distributing the sucked air to the plurality of cylinders 5.

The internal combustion engine 10 includes an exhaust passage 15 for discharging exhaust gas having undergone combustion in the cylinders 5. The aforementioned turbine 202 of the turbocharger 20 is provided at a certain location on the exhaust passage 15. An exhaust-gas purification catalyst 16 for purifying exhaust gas is provided to the exhaust passage 15 on the downstream side of the turbine 202. An exhaust bypass passage 30 connecting the entrance side and the exit side of the turbine 202 by bypassing the turbine 202 is provided to the exhaust passage 15. The exhaust bypass passage 30 is provided with a wastegate valve 31 as an exhaust bypass valve for adjusting the flow rate of exhaust gas flowing through the exhaust bypass passage 30.

An actuator 34 for changing the actuated position of the wastegate valve 31 is connected to the wastegate valve 31 via a connection mechanism 32. Further, a wastegate valve opening degree sensor 43 is provided which detects the movement position in the axial direction of an output shaft 33 of the actuator 34.

Outputs from the air flow sensor 41, the boost pressure sensor 42, and the wastegate valve opening degree sensor 43 are inputted to a control device 40, and the control device 40 performs drive control of the actuator 34.

Figure 3:
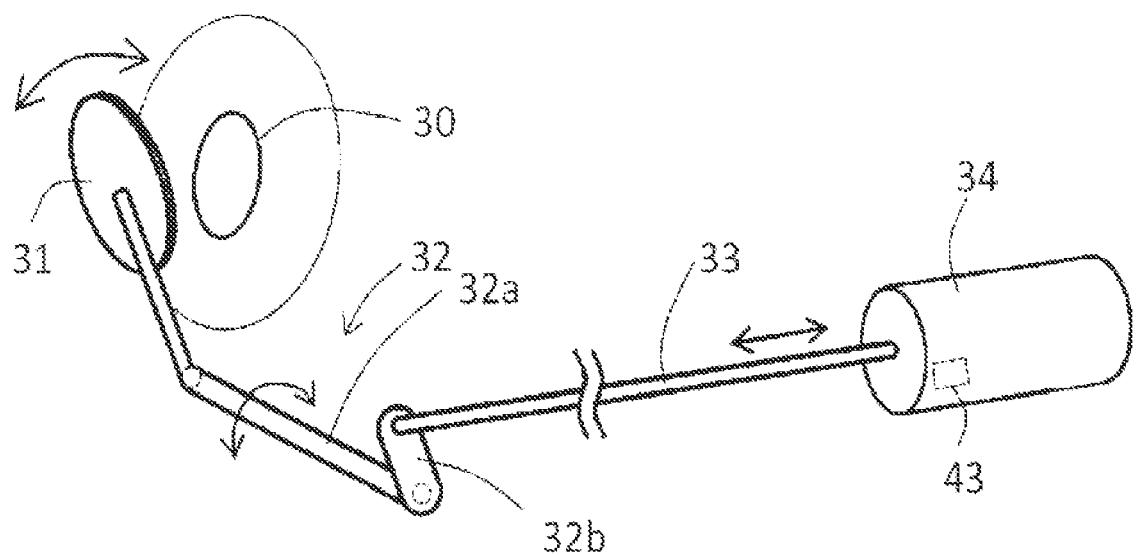
FIG. 3 is a schematic view of a driving mechanism for a wastegate valve of the internal combustion engine.

In the first embodiment, as shown in FIG. 3, the wastegate valve 31 and the actuator 34 are mechanically connected via the connection mechanism 32. The connection mechanism 32 is configured as a link mechanism for converting a linear motion of the output shaft 33 of the actuator 34 to rotational motion for opening or closing the wastegate valve 31. The connection mechanism 32 includes a valve rotation shaft 32a for rotationally moving the wastegate valve 31, and an arm 32b which extends outward in the radial direction from the valve rotation shaft 32a and rotates integrally with the valve rotation shaft 32a. An end of the arm 32b and an end of the output shaft 33 of the actuator 34 are connected so as to be rotatable relative to each other, by a pin or the like. Thus, when the output shaft 33 of the actuator 34 moves to one side in the axial direction, the wastegate valve 31 is closed, and when the output shaft 33 of the actuator 34 moves to the other side in the axial direction, the wastegate valve 31 is opened. The opening degree of the wastegate valve 31 changes in accordance with the movement position of the output shaft 33 of the actuator 34.

The actuator 34 includes: a motor for which the generation direction, i.e., forward rotation/reverse rotation, of a rotational driving force and the magnitude of the rotational driving force are controlled by the control device 40; a conversion mechanism for converting the rotational motion of the motor to a linear motion; and the output shaft 33 which is linearly moved to one side or the other side in the axial direction by the conversion mechanism. As the conversion mechanism, a feed-screw mechanism, a rack-and-pinion mechanism, or the like is used. The output shaft 33 is formed to be a long rod-like member, in consideration of reduction of heat transferred from the housing of the turbine 202 to the actuator 34, constraint of arrangement space, and the like.

The wastegate valve opening degree sensor 43 is configured to detect the opening degree of the wastegate valve 31 by detecting the movement position in the axial direction of the output shaft 33 of the actuator 34. The wastegate valve opening degree sensor 43 is mounted in the actuator 34 or provided near the actuator 34.

The motor mounted in the actuator 34 is a DC motor, and the magnitude of a rotational driving force generated by the motor and the generation direction, i.e., forward rotation/reverse rotation, of the driving force are changed in accordance with the magnitude and the direction of supply current supplied to the motor.

Figure 2:
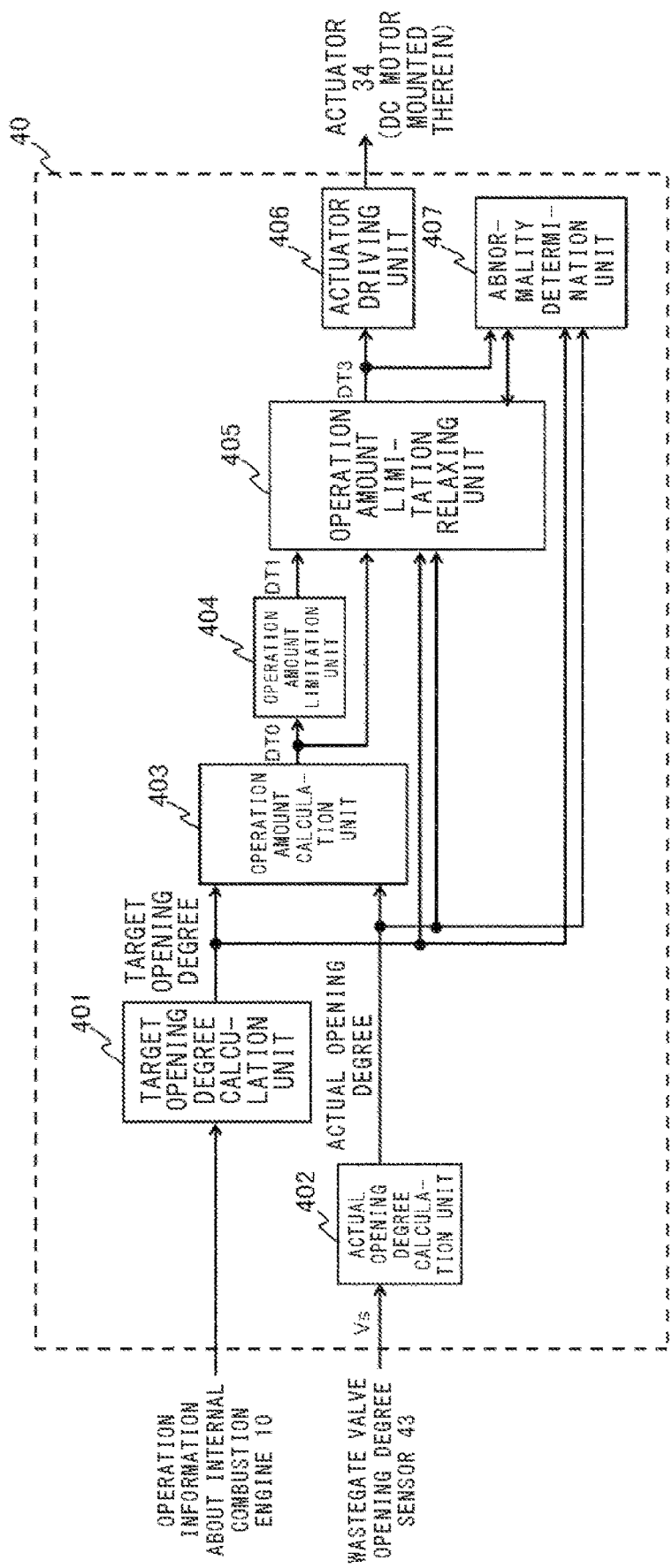
FIG. 2 is a block diagram of the control device for the internal combustion engine according to the first embodiment.

The control device 40 is a control device for controlling the internal combustion engine 10. As shown in FIG. 2, the control device 40 includes control units such as a target opening degree calculation unit 401, an actual opening degree calculation unit 402, an operation amount calculation unit 403, an operation amount limitation unit 404, an operation amount limitation relaxing unit 405, an actuator driving unit 406, and an abnormality determination unit 407. The control units 401 to 407, etc., of the control device 40 are implemented by a processing circuit provided to the control device 40.

Figure 4:
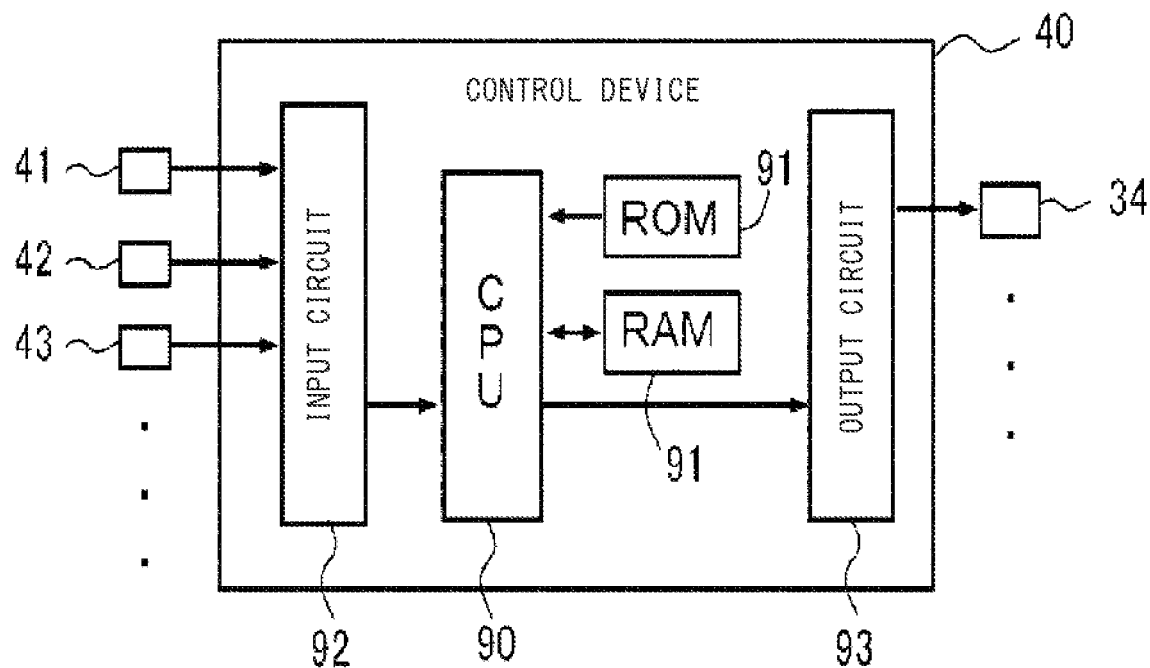
FIG. 4 is a hardware configuration diagram of the control device according to the first embodiment.

Specifically, as shown in FIG. 4, the control device 40 includes, as the processing circuit: a calculation processing device 90 (computer) such as a CPU (Central Processing Unit); a storage device 91 which passes and receives data to and from the calculation processing device 90; an input circuit 92 for inputting an external signal to the calculation processing device 90; an output circuit 93 for outputting a signal to outside from the calculation processing device 90; and the like.

The calculation processing device 90 may include an ASIC (Application Specific Integrated Circuit), an IC (Integrated Circuit), a DSP (Digital Signal Processor), an FPGA (Field Programmable Gate Array), various logical circuits, various signal processing circuits, and the like. A plurality of calculation processing devices 90 that are the same type or different types may be provided, and each process may be executed so as to be shared thereamong. The storage device 91 includes: a RAM (Random Access Memory) configured such that data is readable and writable from the calculation processing device 90; a ROM (Read Only Memory) configured such that data is readable from the calculation processing device 90; and the like. Various sensors and switches are connected to the input circuit 92, and the input circuit 92 is provided with an A/D converter for inputting output signals from the sensors and the switches to the calculation processing device 90, and the like. Electric loads are connected to the output circuit 93, and the output circuit 93 is provided with a driving circuit for outputting control signals from the calculation processing device 90 to the electric loads, and the like.

The functions of the control units 401 to 407, etc., included in the control device 40 are implemented by the calculation processing device 90 executing software (program) stored in the storage device 91 such as the ROM and cooperating with other hardware of the control device 40 such as the storage device 91, the input circuit 92, and the output circuit 93. It is noted that setting data such as characteristic data and determination values used by the control units 401 to 407, etc., are stored as a part of the software (program) in the storage device 91 such as the ROM.

In the first embodiment, besides the air flow sensor 41, the boost pressure sensor 42, and the wastegate valve opening degree sensor 43, various sensors are connected to the input circuit 92, e.g., a crank angle sensor for detecting the rotational angle of a crank shaft of the internal combustion engine 10, a throttle opening degree sensor for detecting the opening degree of the throttle valve 14, and an atmospheric pressure sensor for detecting the atmospheric pressure (these are not shown). Besides the actuator 34, various actuators such as an injector and an ignition coil (both are not shown) are connected to the output circuit 93. On the basis of input of various operation information about the internal combustion engine 10 as described above, the control device 40 drives the above various actuators, thereby controlling the pressure of sucked air pressurized by the compressor 201, so as to be a desired boost pressure, and controlling the combustion state and output torque of the internal combustion engine 10 so as to be optimized.

The target opening degree calculation unit 401 of the control device 40 executes a target opening degree calculation process of calculating a target opening degree for the wastegate valve 31. In the first embodiment, on the basis of operation information about the internal combustion engine 10 such as the rotation speed of the internal combustion engine 10 detected by the crank angle sensor (not shown) as well as the amount of sucked air detected by the air flow sensor 41 and the boost pressure detected by the boost pressure sensor 42, the target opening degree calculation unit 401 determines an optimum required boost pressure, and calculates the opening degree of the wastegate valve 31 for achieving the required boost pressure, as a target opening degree. The target opening degree calculation unit 401 performs feedback control based on a pressure deviation between the actual boost pressure detected by the boost pressure sensor 42 and the required boost pressure, whereby, in the case of increasing the actual boost pressure, the target opening degree is changed to the closing side, and in the case of decreasing the actual boost pressure, the target opening degree is changed to the opening side.

The actual opening degree calculation unit 402 executes an actual opening degree calculation process of calculating the actual opening degree of the wastegate valve 31 on the basis of an electric signal detected by the wastegate valve opening degree sensor 43 and indicating the actuated position of the wastegate valve 31.

Figure 5:
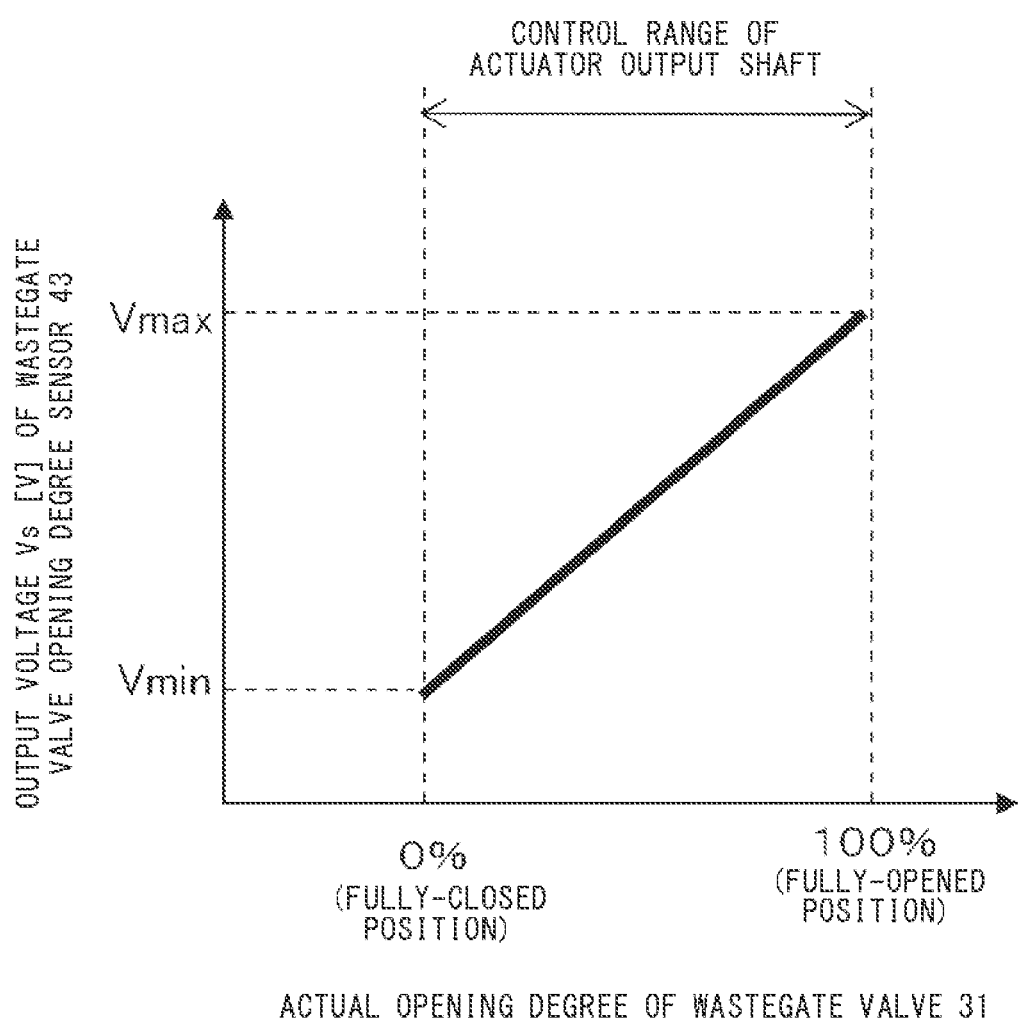
FIG. 5 is a characteristic graph of a wastegate valve opening degree sensor of the internal combustion engine.

FIG. 5 is a characteristic graph in which the vertical axis indicates output voltage Vs of the wastegate valve opening degree sensor 43 detected as the actuated position of the wastegate valve 31, and the horizontal axis indicates the actual opening degree of the wastegate valve 31. The actual opening degree calculation unit 402 calculates the actual opening degree of the wastegate valve 31, using expression (1).

Here, the output voltage of the wastegate valve opening degree sensor 43 is defined as Vs [V], voltage outputted from the wastegate valve opening degree sensor 43 when the wastegate valve 31 is at the fully-closed position, i.e., at an opening degree of 0 [%] is defined as Vmin [V], and voltage outputted from the wastegate valve opening degree sensor 43 when the wastegate valve 31 is at the fully-opened position, i.e., at an opening degree of 100 [%] is defined as Vmax [V]. At this time, the actual opening degree [%] corresponding to the output voltage Vs [V] of the wastegate valve opening degree sensor 43 is calculated by expression (1).

$$\text{Actual opening degree [\%]}=(Vs-Vmin)/(Vmax-Vmin)\times 100 \quad (1)$$

From expression (1), the actual opening degrees of 0 to 100 [%] corresponding to positions from the fully-closed position to the fully-opened position of the wastegate valve 31 are calculated, and this range is defined as a control range of the output shaft 33 of the actuator 34.

As the output voltage Vmin when the wastegate valve 31 is at the fully-closed position and the output voltage Vmax when the wastegate valve 31 is at the fully-opened position, design values are set in advance. However, it is known that the fully-closed position of the wastegate valve 31 is deviated from the design value because of attachment position error occurring when the wastegate valve 31 is attached to the exhaust bypass passage 30, drift of output voltage due to the temperature characteristic of the wastegate valve opening degree sensor 43, thermal expansion of a housing member of the turbocharger 20, or the like. As a measure therefor, the output voltage Vmin when the wastegate valve 31 is at the fully-closed position may be learned.

The operation amount calculation unit 403 executes an operation amount calculation process of calculating a basic operation amount DT0 for the actuator 34 needed for causing the actual opening degree of the wastegate valve 31 to approach the target opening degree. In the first embodiment, the operation amount calculation unit 403 calculates a basic operation amount DT0 (in this example, a value within a range from −100 [%] to +100 [%]) through feedback control such as PID calculation based on the opening degree deviation between the actual opening degree and the target opening degree for the wastegate valve 31.

The operation amount limitation unit 404 executes an operation amount limitation process of limiting the magnitude (absolute value) of the operation amount to a predetermined limit value or lower. In the first embodiment, the operation amount limitation unit 404 calculates an after-limitation-process operation amount DT1 (a value within a range of −L1 [%] to +L1 [%]) obtained by limiting the maximum value of the magnitude (absolute value) of the basic operation amount DT0 by a first limit value L1 [%].

For example, in a state in which the fully-closed position is deviated, if the target opening degree of the wastegate valve 31 is set at 0 [%] (fully-closed position), the wastegate valve 31 reaches the true fully-closed position before the actual opening degree reaches the target opening degree, and as a result, the actual opening degree does not coincide with the target opening degree and the basic operation amount DT0 might become excessive. In addition, also in the case of occurrence of failure such as adhesion of the wastegate valve 31 or output abnormality of the wastegate valve opening degree sensor 43, the actual opening degree does not coincide with the target opening degree and the basic operation amount DT0 becomes excessive. In order to prevent the actuator 34 from causing overheat and leading to breakage even if such a situation as described above has occurred, the operation amount limitation unit 404 limits the maximum value in advance so that the basic operation amount DT0 (absolute value thereof) does not become greater than the first limit value L1.

Figure 6:
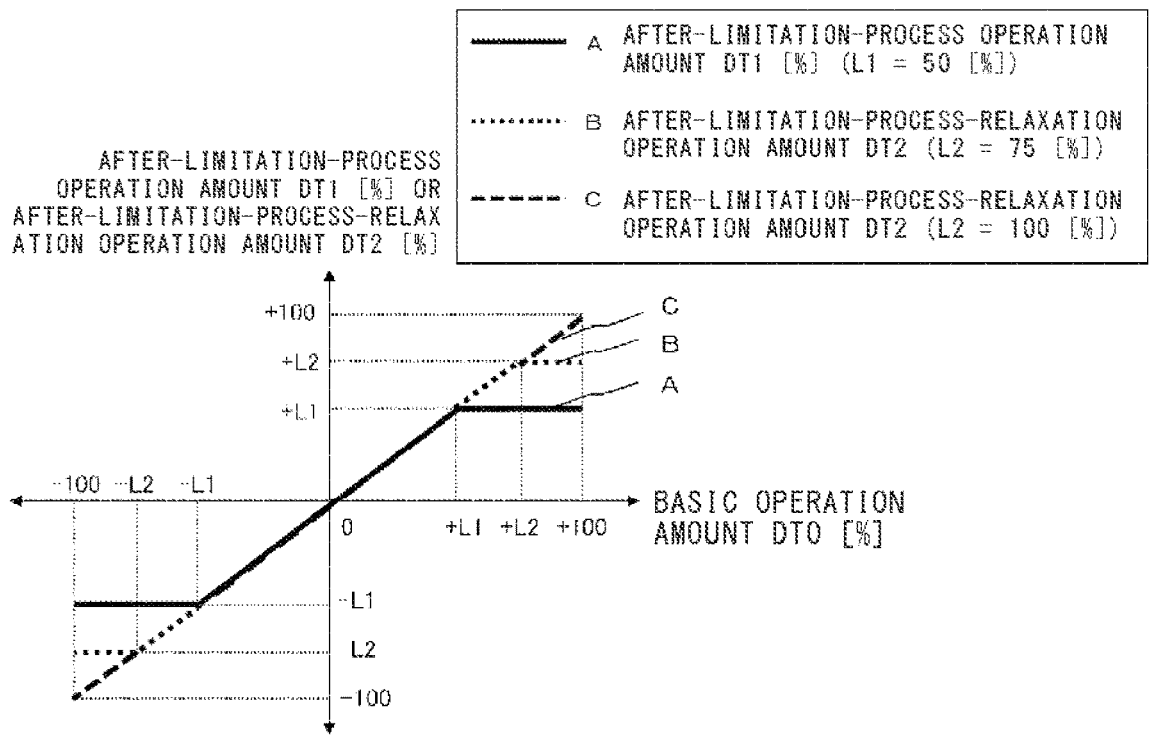
FIG. 6 is a characteristic graph illustrating an operation amount limitation process and an operation amount limitation relaxing process in the control device according to the first embodiment.

In FIG. 6, a solid line (A) is an example of a characteristic graph showing the after-limitation-process operation amount DT1 with respect to the basic operation amount DT0, and 50 [%] is set as the first limit value L1.

Here, in the case of changing the basic operation amount DT0 from 0 [%] to +100 [%], in a range where the basic operation amount DT0 is 0 [%] to +50 [%], the after-limitation-process operation amount DT1 is equal to the basic operation amount DT0, and in a range where the basic operation amount DT0 is +50 [%] to +100 [%], the after-limitation-process operation amount DT1 is limited by the first limit value L1 and thus becomes +50 [%] uniformly.

On the other hand, in the case of changing the basic operation amount DT0 from 0 [%] to −100 [%], in a range where the basic operation amount DT0 is 0 [%] to −50 [%], the after-limitation-process operation amount DT1 is equal to the basic operation amount DT0, and in a range where the basic operation amount DT0 is −50 [%] to −100 [%], the after-limitation-process operation amount DT1 is limited by the first limit value L1 and thus becomes −50 [%] uniformly.

That is, in the case where the maximum value of the basic operation amount DT0 is limited by the first limit value L1=50 [%], even if the basic operation amount DT0 has a value of −100 to +100 [%], the after-limitation-process operation amount DT1 has a value limited within a range of −50 [%] to +50 [%].

Even in the case of limiting the maximum value of the basic operation amount DT0 by the first limit value L1, it is necessary to surpass the pressure of the exhaust gas discharged from the internal combustion engine 10 and control the actual opening degree to be the target opening degree. Therefore, it is necessary that the operation amount for causing a driving force that enables retention control at the fully-closed position can be calculated even under the operation state in which the pressure of the exhaust gas is maximized. In addition, it is necessary to avoid a situation in which, if the maximum value is excessively limited, the follow-up property of the actual opening degree to the target opening degree is reduced and thus the acceleration performance of the internal combustion engine 10 is lowered to an unacceptable level. Therefore, considering the above requirements, maximum motor output, and the like, the first limit value L1 is set to an appropriate value.

While the actuator 34 is driven on the basis of the operation amount limited by the first limit value L1 by the operation amount limitation unit 404, if a state in which the actual opening degree does not coincide with the target opening degree has continued for a predetermined time period or longer, the operation amount limitation relaxing unit 405 executes an operation amount limitation relaxing process of setting, instead of the after-limitation-process operation amount DT1, an after-limitation-process-relaxation operation amount DT2 as a final operation amount DT3 for driving the actuator 34.

In the first embodiment, the operation amount limitation relaxing unit 405 compares the actual opening degree of the wastegate valve 31 with the target opening degree and determines whether or not a state in which the actual opening degree does not coincide with the target opening degree has continued for the predetermined time period or longer. If a state in which the actual opening degree does not coincide with the target opening degree has not continued for the predetermined time period or longer, the operation amount limitation relaxing unit 405 sets the after-limitation-process operation amount DT1 as the final operation amount DT3.

On the other hand, if a state in which the actual opening degree does not coincide with the target opening degree has continued for the predetermined time period or longer, the operation amount limitation relaxing unit 405 sets the after-limitation-process-relaxation operation amount DT2 as the final operation amount DT3. The after-limitation-process-relaxation operation amount DT2 is an operation amount obtained by limiting the maximum value of the basic operation amount DT0 by a second limit value L2 [%] (here, L1 [%]<L2 [%]≤100 [%]) which is set in advance as such a value that relaxes limitation of the maximum value of the basic operation amount DT0 as compared to the first limit value L1 [%], and the after-limitation-process-relaxation operation amount DT2 is calculated to be a value within a range of −L2 [%] to +L2 [%].

In FIG. 6, a dotted line (B) is an example of a characteristic graph showing the after-limitation-process-relaxation operation amount DT2 with respect to the basic operation amount DT0, and 75 [%] is set as the second limit value L2.

Here, in the case of changing the basic operation amount DT0 from 0 [%] to +100 [%], in a range where the basic operation amount DT0 is 0 [%] to +75 [%], the after-limitation-process-relaxation operation amount DT2 is equal to the basic operation amount DT0, and in a range where the basic operation amount DT0 is +75 [%] to +100 [%], the after-limitation-process-relaxation operation amount DT2 is limited by the second limit value L2 and thus becomes +75 [%] uniformly.

On the other hand, in the case of changing the basic operation amount DT0 from 0 [%] to −100 [%], in a range where the basic operation amount DT0 is 0 [%] to −75 [%], the after-limitation-process-relaxation operation amount DT2 is equal to the basic operation amount DT0, and in a range where the basic operation amount DT0 is −75 [%] to −100 [%], the after-limitation-process-relaxation operation amount DT2 is limited by the second limit value L2 and thus becomes −75 [%] uniformly.

That is, in the case where the maximum value of the basic operation amount DT0 is limited by the second limit value L2=75 [%], even if the basic operation amount DT0 has a value of −100 to +100 [%], the maximum value limitation for the after-limitation-process-relaxation operation amount DT2 is relaxed as compared to the after-limitation-process operation amount DT1, and thus the after-limitation-process-relaxation operation amount DT2 has a value limited within a range of −75 [%] to +75 [%].

In FIG. 6, a chain line (C) is another example of a characteristic graph showing the after-limitation-process-relaxation operation amount DT2 with respect to the basic operation amount DT0, and in this case, 100 [%] is set as the second limit value L2. In the case of this setting, even if the basic operation amount DT0 is changed from −100 [%] to +100 [%], the after-limitation-process-relaxation operation amount DT2 is equal to the basic operation amount DT0.

That is, in the case where the maximum value of the basic operation amount DT0 is limited by the second limit value L2=100 [%], the basic operation amount DT0 is not subjected to maximum value limitation.

The actuator driving unit 406 executes an actuator driving process of performing driving control for the actuator 34 on the basis of the final operation amount DT3. When the motor mounted in the actuator 34 is energized with current according to the final operation amount DT3, the motor rotates and thus the output shaft 33 of the actuator 34 moves, whereby the actuated position of the wastegate valve 31 is changed.

The final operation amount DT3 serves as a parameter for determining the energization direction and the energization current for the motor, and is treated as an ON duty signal ranging from the −100 [%] to +100 [%], inside the actuator 34.

Figure 7:
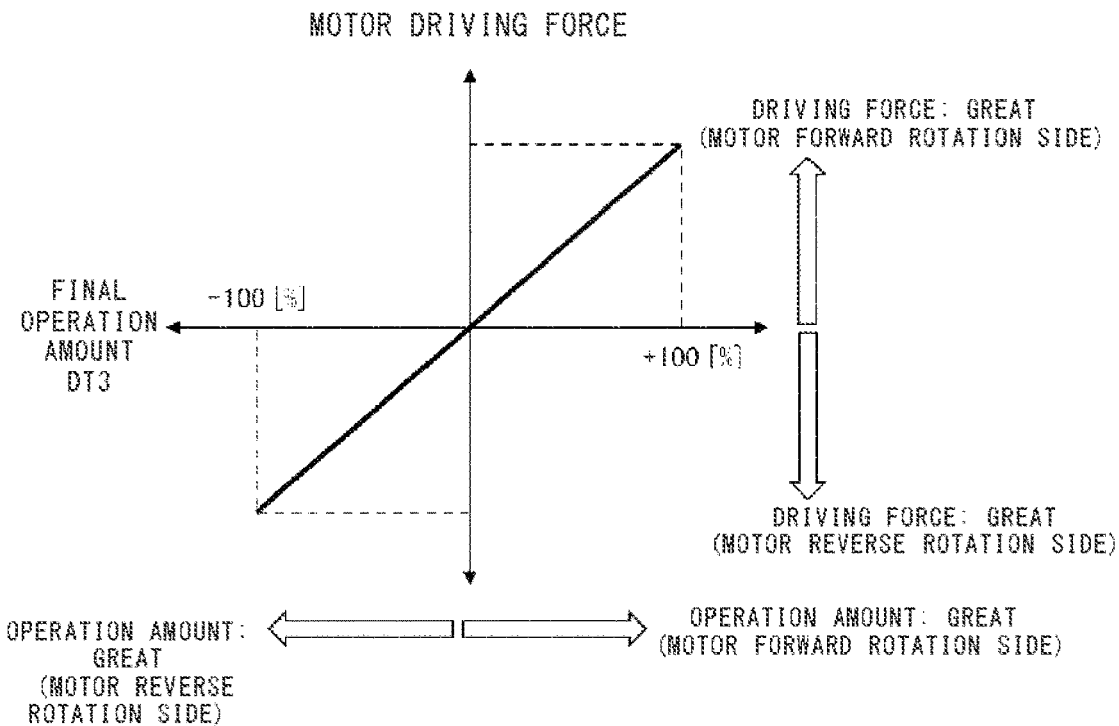
FIG. 7 is a characteristic graph showing the relationship between an operation amount and a driving force of an actuator of the internal combustion engine.

FIG. 7 is a characteristic graph showing the relationship between the final operation amount DT3 and a motor driving force. When the final operation amount DT3 is 0 [%], current flowing through the motor also becomes 0 {A} and a driving force generated by the motor also becomes zero. When the operation amount is 0 to +100 [%], the motor is energized with current for forward rotation according to the magnitude (absolute value) of the operation amount, and the output shaft 33 is pushed outward of the actuator 34. Thus, the wastegate valve 31 moves to the opening side. When the operation amount is 0 to −100 [%], the motor is energized with current for reverse rotation according to the magnitude (absolute value) of the operation amount, and the output shaft 33 is retracted to the inside of the actuator 34. Thus, the wastegate valve 31 moves to the closing side. In this way, in accordance with the sign and the magnitude of the final operation amount DT3, the extension/contraction direction of the output shaft 33 of the actuator 34 and the magnitude of a thrust force outputted by the actuator 34 are changed.

The abnormality determination unit 407 executes an abnormality determination process of determining that abnormality has occurred in the opening degree control system of the wastegate valve 31, if a state in which the actual opening degree does not coincide with the target opening degree is not eliminated and has continued for a predetermined time period or longer even though the maximum value limitation for the operation amount is relaxed.

In the first embodiment, the abnormality determination unit 407 determines whether or not the maximum value limitation for the basic operation amount DT0 is relaxed, on the basis of whether or not the magnitude (absolute value) of the final operation amount DT3 is greater than the magnitude (absolute value) of the first limit value L1. In addition, the abnormality determination unit 407 compares the actual opening degree of the wastegate valve 31 with the target opening degree and determines whether or not a state in which the actual opening degree does not coincide with the target opening degree has continued for a predetermined time period or longer. Then, if a state in which the actual opening degree does not coincide with the target opening degree has continued for the predetermined time period or longer even though the maximum value limitation for the basic operation amount DT0 is relaxed (that is, instead of the after-limitation-process operation amount DT1, the after-limitation-process-relaxation operation amount DT2 is set as the final operation amount DT3), the abnormality determination unit 407 determines that abnormality has occurred in the opening degree control system for the wastegate valve 31.

Next, with reference to time charts shown in FIG. 8 to FIG. 12, the behaviors of the operation amount limitation process and the operation amount limitation relaxing process will be described.

In each time chart in FIG. 8 to FIG. 12, the horizontal axis indicates an elapsed time, and major time points are denoted by T1 to T11. In each time chart in FIG. 8 to FIG. 12, at the upper stage, the behaviors of the target opening degree and the actual opening degree of the wastegate valve 31 are shown in an overlapped manner, and at the lower stage, the behavior of the final operation amount DT3 is shown. Each time chart in FIG. 8 to FIG. 12 shows an example in which the target opening degree changes in a stepwise manner from K1 to K3 at time T1.

Figure 8:
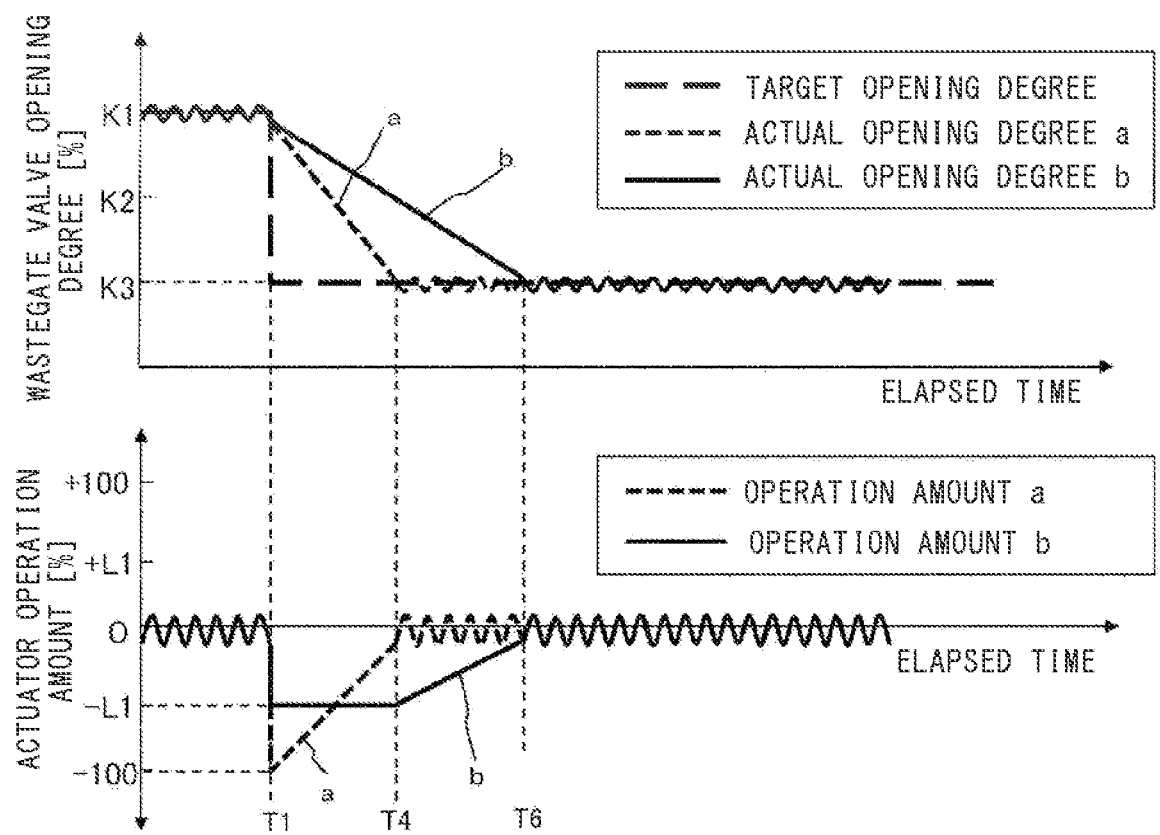
FIG. 8 is a time chart illustrating difference in behavior of opening degree control for the wastegate valve depending on whether or not maximum value limitation is performed for the operation amount (in the case where an opening degree control system is normal)

FIG. 8 shows time charts for the case where the operation amount limitation process is applied and the case where the operation amount limitation process is not applied, and it is assumed that the opening degree control system for the wastegate valve 31 is normal.

In the case where the operation amount limitation process is not applied (dotted-line chart in FIG. 8), before time T1, an actual opening degree (a) almost coincides with the target opening degree K1, and an operation amount (a) stays around 0 [%] while the sign thereof is inverted.

At time T1, the target opening degree (broken-line chart) changes in a stepwise manner from K1 to K3, whereby a great opening degree deviation occurs between the target opening degree and the actual opening degree (a), and on the basis of the opening degree deviation, a great feedback correction amount is calculated. Accordingly, the operation amount (a) having thus far stayed around 0 [%] increases to a great value on the minus-sign side (in FIG. 8, increases to −100 [%]). As a result, a driving force toward the motor reverse rotation side increases, and the actual opening degree (a) starts to move toward the target opening degree K3 and reaches the target opening degree K3 at time T4.

During the period from time T1 to time T4, as the actual opening degree (a) approaches the target opening degree K3, the opening degree deviation decreases, so that the operation amount (a) also decreases. Then, after time T4, the actual opening degree (a) almost coincides with the target opening degree K3, and the operation amount (a) again comes to stay around 0 [%] while the sign thereof is inverted.

On the other hand, in the case where the operation amount limitation process is applied (in FIG. 8, solid-line chart), before time T1, the actual opening degree (b) almost coincides with the target opening degree K1, and the operation amount (b) stays around 0 [%] while the sign thereof is inverted. In this state, the magnitude of the operation amount needed for causing the actual opening degree (b) to coincide with the target opening degree K1 is smaller than the first limit value L1, and therefore the operation amount (b) is not limited by the first limit value L1.

At time T1, the target opening degree (broken-line chart) changes in a stepwise manner from K1 to K3, whereby a great opening degree deviation occurs between the target opening degree and the actual opening degree (b), and on the basis of the opening degree deviation, a great feedback correction amount is calculated. Accordingly, the operation amount (b) having thus far stayed around 0 [%] is to increase to a great value on the minus-sign side, but since the operation amount limitation process is applied, the maximum value of the operation amount (b) is limited by the first limit value L1. As a result, although the driving force is smaller than in the case where the operation amount limitation process is not applied (dotted-line chart in FIG. 8), the driving force toward the motor reverse rotation side increases, and the actual opening degree (b) starts to move toward the target opening degree K3 and reaches the target opening degree K3 at time T6.

During the period from time T1 to time T6, as the actual opening degree (b) approaches the target opening degree K3, the opening degree deviation decreases, so that the operation amount (b) also decreases. However, since the magnitude of the basic operation amount DT0 calculated during the period from time T1 to time T4 is greater than the first limit value L1, the operation amount (b) stays at −L1 [%] during the period from time T1 to time T4. Then, at time T4, the magnitude of the basic operation amount DT0 at last becomes smaller than the first limit value L1, and after time T4, as the actual opening degree (b) approaches the target opening degree K3, the opening degree deviation decreases, so that the operation amount (b) also decreases.

After time T6, the actual opening degree (b) almost coincides with the target opening degree K3, and the operation amount (b) again comes to stays around 0 [%] while the sign thereof is inverted.

Figure 9:
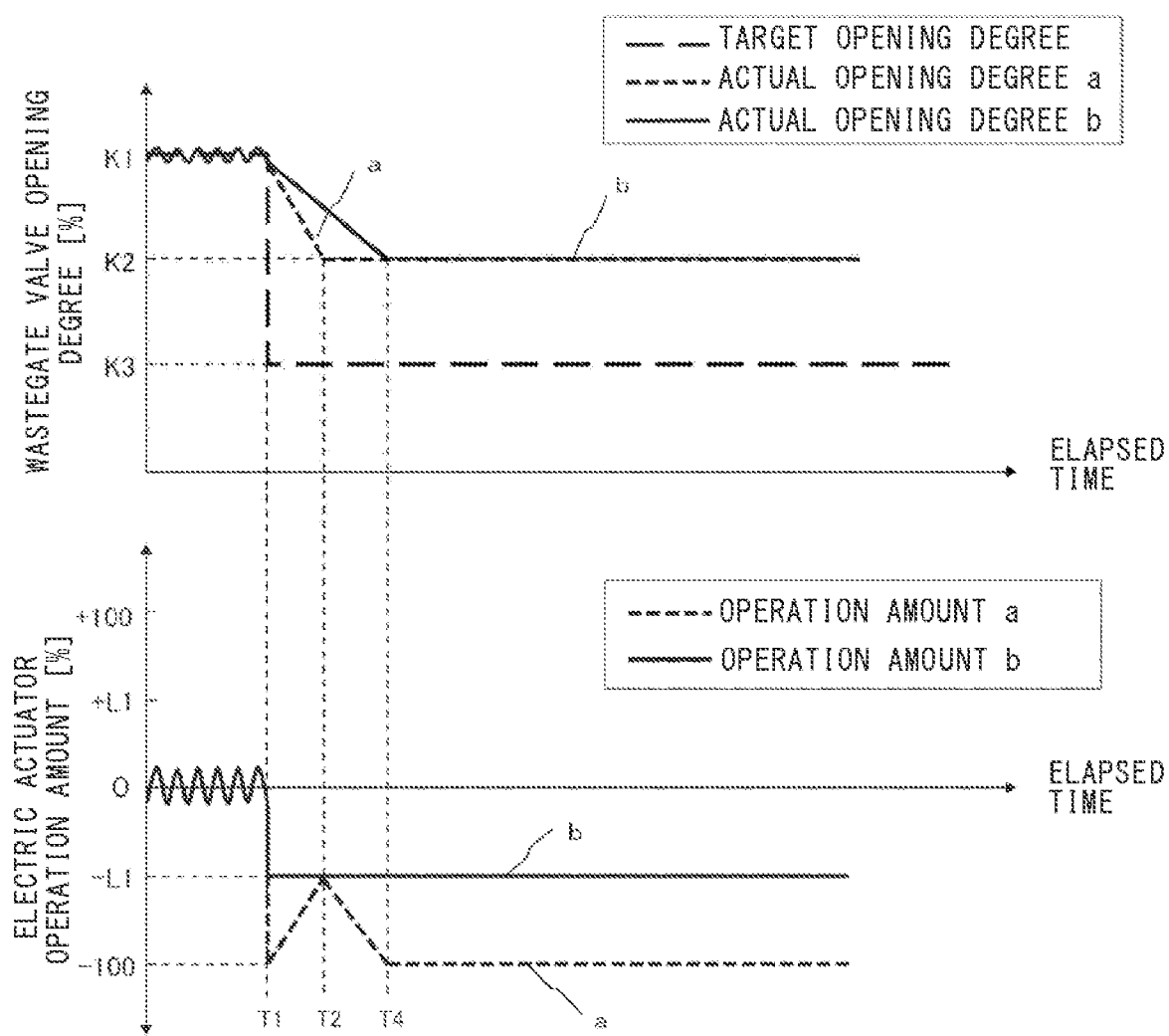
FIG. 9 is a time chart illustrating difference in behavior of opening degree control for the wastegate valve depending on whether or not maximum value limitation is performed for the operation amount (in the case where abnormality occurs in the opening degree control system)

FIG. 9 shows time charts for the case where the operation amount limitation process is applied and the case where the operation amount limitation process is not applied, as in FIG. 8. However, in FIG. 9, unlike FIG. 8, it is assumed that abnormality occurs somewhere in the connection mechanism 32 between the actuator 34 and the wastegate valve 31, so that the wastegate valve opening degree does not change to the closing side from the position of K2.

In the case where the operation amount limitation process is not applied (dotted-line chart in FIG. 9), before time T1, an actual opening degree (a) almost coincides with the target opening degree K1, and an operation amount (a) stays around 0 [%] while the sign thereof is inverted.

At time T1, the target opening degree (broken-line chart) changes in a stepwise manner from K1 to K3, whereby a great opening degree deviation occurs between the target opening degree and the actual opening degree (a), and on the basis of the opening degree deviation, a great feedback correction amount is calculated. Accordingly, the operation amount (a) having thus far stayed around 0 [%] increases to a great value on the minus-sign side (also in FIG. 9, increases to −100 [%] as in FIG. 8). As a result, a driving force toward the motor reverse rotation side increases, and the actual opening degree (a) starts to move toward the target opening degree K3.

However, in FIG. 9, since abnormality occurs so that the actual opening degree (a) does not change to the closing side from the position of K2, the actual opening degree (a) no longer moves toward the closing side from K2 after reaching K2 at time T2.

During the period from time T1 to time T2, as the actual opening degree (a) approaches the target opening degree K3, the opening degree deviation decreases, so that the operation amount (a) also decreases. However, after time T2, the actual opening degree (a) does not change while remaining K2, and therefore a state in which the opening degree deviation is not eliminated continues. Thus, the feedback correction amount increases again, and after time T4, stays at −100 [%].

On the other hand, in the case where the operation amount limitation process is applied (solid-line chart in FIG. 9), before time T1, an actual opening degree (b) almost coincides with the target opening degree K1, and an operation amount (b) stays around 0 [%] while the sign thereof is inverted. In this state, the magnitude of the operation amount needed for causing the actual opening degree (b) to coincide with the target opening degree K1 is smaller than the first limit value L1, and therefore the operation amount (b) is not limited by the first limit value L1.

At time T1, the target opening degree (broken-line chart) changes in a stepwise manner from K1 to K3, whereby a great opening degree deviation occurs between the target opening degree and the actual opening degree (b), and on the basis of the opening degree deviation, a great feedback correction amount is calculated.

Accordingly, the operation amount (b) having thus far stayed around 0 [%] is to increase to a great value on the minus-sign side, but since the operation amount limitation process is applied, the maximum value of the operation amount (b) is limited by the first limit value L1. As a result, although the driving force is smaller than in the case where the operation amount limitation process is not applied (dotted-line chart in FIG. 9), the driving force toward the motor reverse rotation side increases, and the actual opening degree (b) starts to move toward the target opening degree K3.

However, in FIG. 9, since abnormality occurs so that the wastegate valve opening degree does not change to the closing side from the position of K2, the actual opening degree (b) no longer moves toward the closing side from K2 after reaching K2 at time T4.

During the period from time T1 to time T4, as the actual opening degree (b) approaches the target opening degree K3, the opening degree deviation decreases, so that the operation amount (b) also decreases. However, since the magnitude of the basic operation amount DT0 calculated during the period from time T1 to time T4 is greater than the first limit value L1, the operation amount (b) during the period from time T1 to time T4 stays at −L1 [%]. Also after time T4, the magnitude of the basic operation amount remains greater than the first limit value L1, and therefore the operation amount (b) continues staying at −L1 [%].

As compared to the case where the operation amount limitation process is not applied (dotted-line charts in FIG. 8 and FIG. 9), a time period required until the actual opening degree reaches the target opening degree in the case where the operation amount limitation process is applied (solid-line charts in FIG. 8 and FIG. 9) is prolonged (follow-up property reduces) because of the limitation of the maximum value of the operation amount, but on the other hand, since the maximum current supplied to the actuator 34 is limited, occurrence of overheat is prevented even if such abnormality that the opening degree deviation continues not being eliminated occurs.

Figure 10:
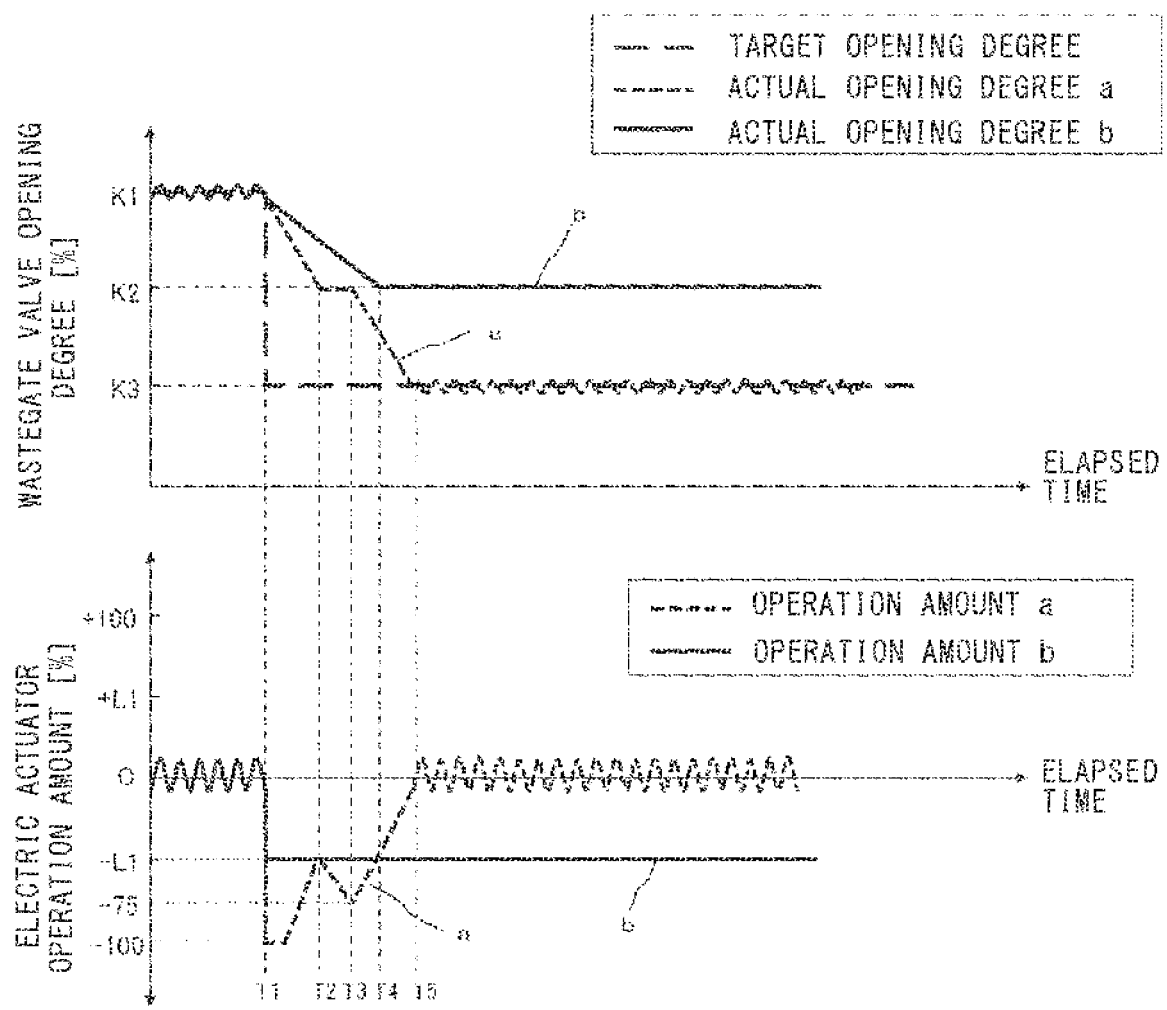
FIG. 10 is a time chart illustrating difference of behavior of opening degree control for the wastegate valve depending on whether or not maximum value limitation is performed for the operation amount (in the case where catching occurs in operation of the opening degree control system)

FIG. 10 shows time charts for the case where the operation amount limitation process is applied and the case where the operation amount limitation process is not applied, as in FIG. 8 and FIG. 9. However, in FIG. 10, unlike FIG. 8 and FIG. 9, it is assumed that, due to adherence of a foreign material or distortion of the movable member somewhere in the connection mechanism 32 between the actuator 34 and the wastegate valve 31, the frictional resistance of the connection mechanism 32 increases, and when the opening degree is around K2, the follow-up property of the actual opening degree to the target opening degree is reduced and catching occurs in operation of the actual opening degree.

In the case where the operation amount limitation process is not applied (dotted-line chart in FIG. 10), before time T1, an actual opening degree (a) almost coincides with the target opening degree K1 and an operation amount (a) stays around 0 [%] while the sign thereof is inverted.

At time T1, the target opening degree (broken-line chart) changes in a stepwise manner from K1 to K3, whereby a great opening degree deviation occurs between the target opening degree and the actual opening degree (a), and on the basis of the opening degree deviation, a great feedback correction amount is calculated.

Accordingly, the operation amount (a) having thus far stayed around 0 [%] increases to a great value on the minus-sign side (also in FIG. 10, increases to −100 [%] as in FIG. 8 and FIG. 9). As a result, a driving force toward the motor reverse rotation side increases and the actual opening degree (a) starts to move toward the target opening degree K3. However, in FIG. 10, when the actual opening degree (a) reaches the position of K2, catching occurs against operation of further changing to the closing side. Therefore, after reaching K2 at time T2, the actual opening degree (a) no longer moves toward the closing side from K2 during the period from time T2 to time T3.

During the period from time T1 to time T2, as the actual opening degree (a) approaches the target opening degree K3, the opening degree deviation decreases, so that the operation amount (a) also decreases. However, since the actual opening degree (a) temporarily stays at K2 without changing after time T2, the opening degree deviation continues not being eliminated, and thus the feedback correction amount increases again during the period from time T2 to time T3.

In addition, during the period from time T2 to time T3, as the operation amount (a) increases, the driving force of the actuator 34 also increases again.

When the operation amount (a) increases to −75 [%] at time T3, the driving force of the actuator 34 surpasses the frictional resistance which causes the above catching, and the actual opening degree (a) having stayed at the position of K2 starts to move toward the target opening degree K3 again, and then, at time T5, reaches the target opening degree K3 at last. During the period from time T3 to time T5, as the actual opening degree (a) approaches the target opening degree K3, the opening degree deviation decreases, so that the operation amount (a) also decreases.

Then, after time T5, the actual opening degree (a) almost coincides with the target opening degree K3, and the operation amount (a) again comes to stay around 0 [%] while the sign thereof is inverted.

On the other hand, in the case where the operation amount limitation process is applied (solid-line chart in FIG. 10), before time T1, an actual opening degree (b) almost coincides with the target opening degree K1, and an operation amount (b) stays around 0 [%] while the sign thereof is inverted. In this state, the magnitude of the operation amount needed for keeping the actual opening degree (b) at the target opening degree K1 is smaller than the first limit value L1, and therefore the operation amount is not limited by the first limit value L1.

At time T1, the target opening degree (broken-line chart) changes in a stepwise manner from K1 to K3, whereby a great opening degree deviation occurs between the target opening degree and the actual opening degree (b), and on the basis of the opening degree deviation, a great feedback correction amount is calculated. Accordingly, the operation amount (b) having thus far stayed around 0 [%] is to increase to a great value on the minus-sign side, but since the operation amount limitation process is applied, the maximum value of the operation amount (b) is limited by the first limit value L1. Therefore, at time T1, the maximum value is limited to −L1 [%].

As a result, although the driving force is smaller than in the case where the operation amount limitation process is not applied (dotted-line chart in FIG. 10), the driving force toward the motor reverse rotation side increases, and the actual opening degree (b) starts to move toward the target opening degree K3. However, in FIG. 10, when the actual opening degree (b) reaches the position of K2, catching occurs against operation of further changing to the closing side. Therefore, after reaching K2 at time T4, the actual opening degree (b) no longer moves toward the closing side from K2 after time T4.

At time T4 when the actual opening degree (b) reaches K2, the operation amount (b) has already stayed at −L1 [%] which is the first limit value, and the operation amount cannot be increased any more. Therefore, the driving force cannot be increased to such a level as to surpass the frictional resistance which causes the above catching, and the actual opening degree (b) still stays at the position of K2.

In the case where it is assumed that, due to adherence of a foreign material or distortion of the movable member somewhere in the engagement part between the motor mounted in the actuator 34 and the wastegate valve 31, the frictional resistance of the connection mechanism 32 increases and catching occurs in operation of the actual opening degree around K2, if the operation amount limitation process is not applied, there is a risk of occurrence of overheat but the magnitude of the operation amount can be increased to be greater than L1 [%]. Therefore, there are increased opportunities that the actual opening degree can coincide with the target opening degree by surpassing the increased frictional resistance, and thus it is possible to suppress such an event as to reach determination that abnormality has occurred in the opening degree control system for the wastegate valve 31.

Figure 11:
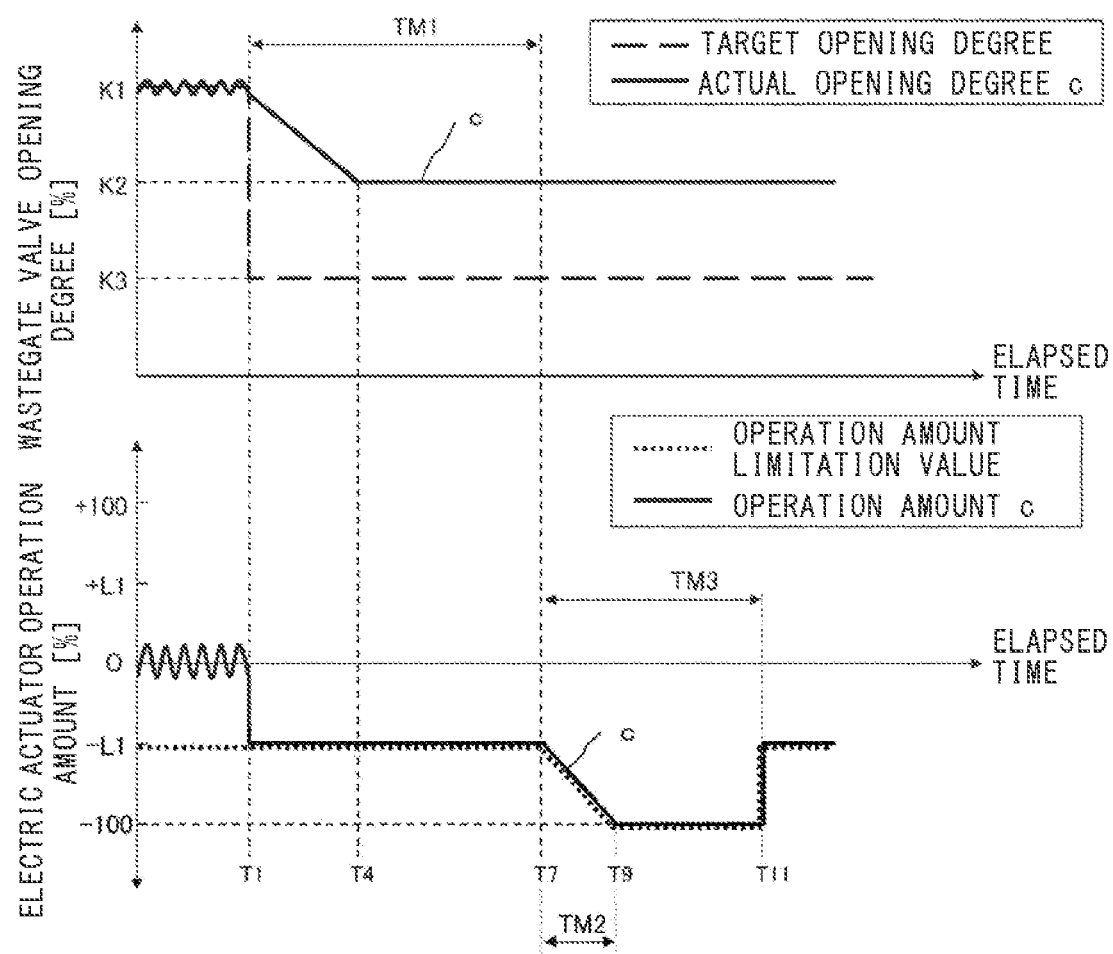
FIG. 11 is a time chart illustrating the behavior of opening degree control for the wastegate valve by an operation amount limitation process in an abnormality determination unit according to the first embodiment (in the case where catching occurs in operation of the opening degree control system)

FIG. 11 is a time chart illustrating the behavior of opening degree control for the wastegate valve 31 by the operation amount limitation process in the abnormality determination unit 407 according to the first embodiment. In FIG. 11, as in the above assumed condition in FIG. 9, it is assumed that abnormality occurs somewhere in the connection mechanism 32 between the actuator 34 and the wastegate valve 31, so that the wastegate valve opening degree does not change to the closing side from the position of K2.

In FIG. 11, before time T1, an actual opening degree (c) almost coincides with the target opening degree K1, and the operation amount (c) stays around 0 [%] while the sign thereof is inverted. In this state, the magnitude of the operation amount needed for causing the actual opening degree (c) to coincide with the target opening degree K1 is smaller than the first limit value L1, and therefore the operation amount (c) is not limited by the first limit value L1.

At time T1, the target opening degree (broken-line chart) changes in a stepwise manner from K1 to K3, whereby a great opening degree deviation occurs between the target opening degree and the actual opening degree (c), and on the basis of the opening degree deviation, a great feedback correction amount is calculated. Accordingly, the operation amount (c) having thus far stayed around 0 [%] is to increase to a great value on the minus-sign side, but since the operation amount limitation process is applied, the maximum value of the operation amount (c) is limited by the first limit value L1. Therefore, at time T1, the maximum value is limited to −L1 [%].

As a result, after time T1, the actual opening degree (c) starts to move toward the target opening degree, by a driving force toward the motor reverse rotation side according to the operation amount limited to −L1 [%]. However, in FIG. 11, as in the assumed condition in FIG. 9, since abnormality occurs so that the wastegate valve opening degree does not change to the closing side from the position of K2, the actual opening degree (c) no longer moves toward the closing side from K2 after reaching K2 at time T4.

During the period from time T1 to time T4, as the actual opening degree (c) approaches the target opening degree K3, the opening degree deviation decreases, so that the operation amount (c) also decreases. However, since the magnitude of the basic operation amount DT0 calculated during the period from time T1 to time T4 is greater than the first limit value L1, the operation amount (c) during the period from time T1 to time T4 stays at −L1 [%]. Also after time T4, the magnitude of the basic operation amount remains greater than the first limit value L1, and therefore the operation amount (c) continues staying at −L1 [%].

Then, at time T7 when a predetermined time period TM1 has elapsed in a state in which the deviation between the actual opening degree (c) and the target opening degree continues not being eliminated, the operation amount limitation relaxing unit 405 of the first embodiment executes maximum value limitation relaxation by the second limit value L2, instead of the maximum value limitation by the first limit value L1.

In FIG. 11, the second limit value L2 is set at 100 [%]. In this example, in switching from the first limit value L1 to the second limit value L2, the limitation is gradually relaxed over a time period TM2 from time T7 to time T9. However, instead of 100 [%] (no limitation), the second limit value L2 may be set at an appropriate value between L1 [%] and 100 [%], e.g., 75 [%]. In addition, the switching from the first limit value L1 to the second limit value L2 may be performed at once in a stepwise manner.

As described above, if the limitation of the maximum value is relaxed, the operation amount (c) having thus far stayed at −L1 [%] gradually increases from −L1 [%] to −L2 (=−100) [%] over the time period TM2 from time T7 to time T9. However, in this case, as in the assumed condition in FIG. 9, abnormality has occurred somewhere in the engagement part between the motor mounted in the actuator 34 and the wastegate valve 31, so that the wastegate valve opening degree does not change to the closing side from the position of K2. Therefore, also after time T7, the actual opening degree (c) still does not change from the position of K2 and thus the deviation between the actual opening degree (c) and the target opening degree continues not being eliminated. Then, at time T11 when a predetermined time period TM3 has elapsed since time T7 when the relaxation of the maximum value limitation was started, the abnormality determination unit 407 determines that abnormality has occurred in the opening degree control system for the wastegate valve 31.

If the abnormality determination unit 407 determines that abnormality has occurred in the opening degree control system for the wastegate valve 31, the operation amount limitation relaxing unit 405 cancels the maximum value limitation relaxation by the second limit value L2 so as to return to the state in which the maximum value limitation by the first limit value L1 is performed, in order to prevent overheat from being caused by the actuator 34 continuing to be driven with the operation amount for which the maximum value limitation is relaxed.

Figure 12:
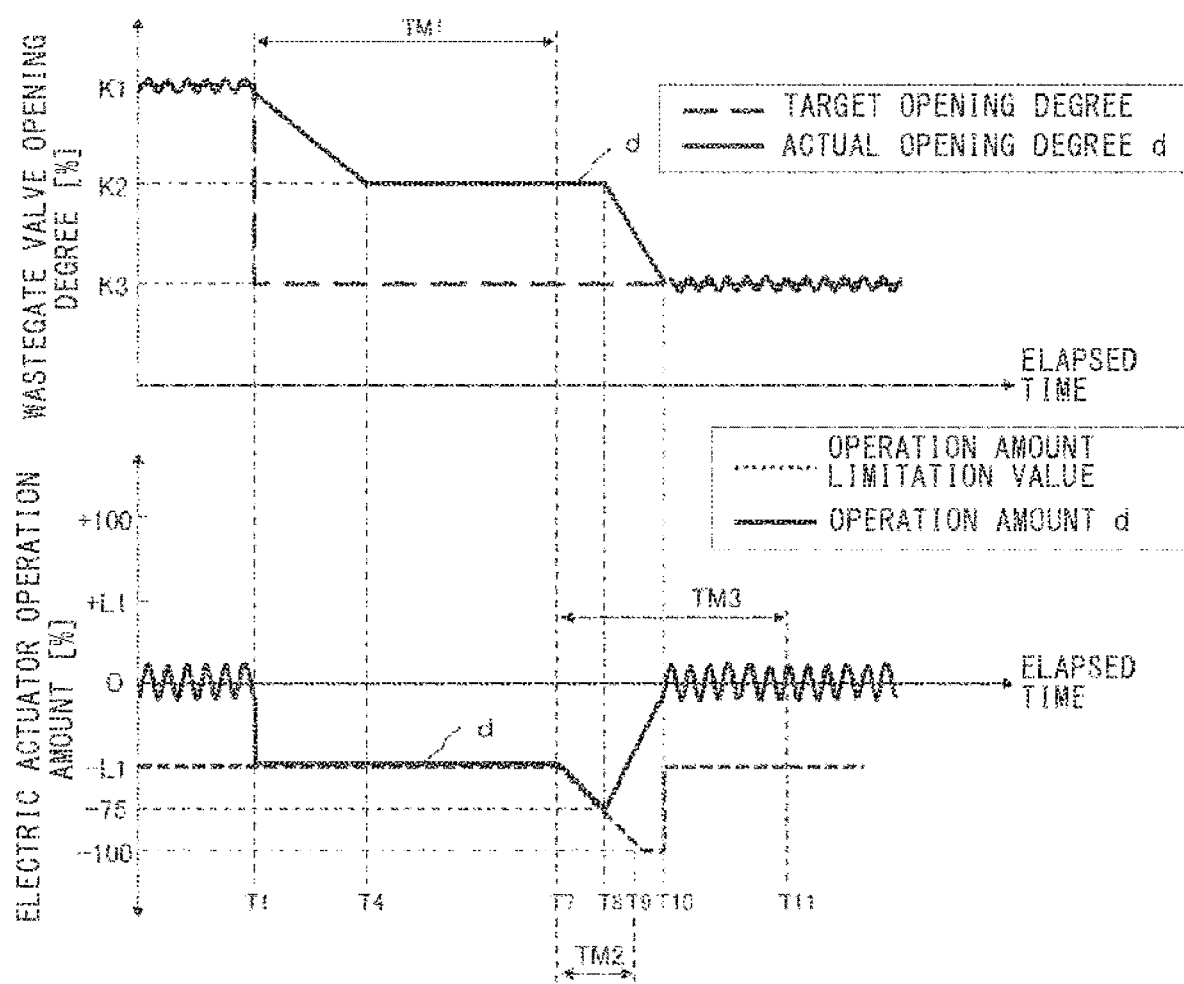
FIG. 12 is a time chart illustrating the behavior of opening degree control for the wastegate valve by the operation amount limitation process in the abnormality determination unit according to the first embodiment (in the case where catching occurs in operation of the opening degree control system)

FIG. 12 is a time chart illustrating the behavior of opening degree control for the wastegate valve by the operation amount limitation process in the abnormality determination unit 407 according to the first embodiment. In FIG. 12, as in the above assumed condition in FIG. 10, it is assumed that, due to adherence of a foreign material or distortion of the movable member somewhere in the engagement part between the motor mounted in the actuator 34 and the wastegate valve 31, the frictional resistance of the connection mechanism 32 increases, and when the opening degree is around K2, catching occurs in operation of the actual opening degree.

In FIG. 12, before time T1, an actual opening degree (d) almost coincides with the target opening degree K1, and the operation amount (d) stays around 0 [%] while the sign thereof is inverted. In this state, the magnitude of the operation amount needed for keeping the actual opening degree (d) at the target opening degree K1 is smaller than the first limit value L1, and therefore the operation amount is not limited by the first limit value L1.

At time T1, the target opening degree (broken-line chart) changes in a stepwise manner from K1 to K3, whereby a great opening degree deviation occurs between the target opening degree and the actual opening degree (d), and on the basis of the opening degree deviation, a great feedback correction amount is calculated.

Accordingly, the operation amount (d) having thus far stayed around 0 [%] is to increase to a great value on the minus-sign side, but since the operation amount limitation process is applied, the maximum value of the operation amount (d) is limited by the first limit value L1. Therefore, at time T1, the maximum value is limited to −L1 [%].

As a result, after time T1, the actual opening degree (d) starts to move toward the target opening degree, by a driving force toward the motor reverse rotation side according to the operation amount limited to −L1 [%]. However, in FIG. 12, as in the assumed condition in FIG. 10, when the wastegate valve opening degree reaches the position of K2, catching occurs against operation of further changing to the low-opening-degree side. Therefore, after reaching K2 at time T4, the actual opening degree (d) no longer moves toward the closing side from K2.

During the period from time T1 to time T4, as the actual opening degree (d) approaches the target opening degree K3, the opening degree deviation decreases, so that the operation amount (d) also decreases. However, since the magnitude of the basic operation amount DT0 calculated between the period from time T1 to time T4 is greater than the first limit value L1, the operation amount (d) during the period from time T1 to time T4 stays at −L1 [%]. Also after time T4, the magnitude of the basic operation amount is greater than the first limit value L1, and therefore the operation amount (d) continues staying at −L1 [%].

Then, at time T7 when the predetermined time period TM1 has elapsed in a state in which the deviation between the actual opening degree (d) and the target opening degree continues not being eliminated, the operation amount limitation relaxing unit 405 of the first embodiment executes maximum value limitation relaxation by the second limit value L2, instead of the maximum value limitation by the first limit value L1.

As in FIG. 11, FIG. 12 shows an example in which the second limit value L2 is set at 100 [%], and in switching from the first limit value L1 to the second limit value L2, the limitation is gradually relaxed over the time period TM2 from time T7 to time T9.

As described above, if the limitation of the maximum value is relaxed, the operation amount (d) having thus far stayed at −L1 [%] gradually increases from time T7, and at time T8 when the operation amount (d) increases to −75 [%], the driving force of the actuator 34 surpasses the frictional resistance which causes the above catching, and the actual opening degree (d) having stayed at the position of K2 starts to move toward the target opening degree K3 again, and then, at time T10, reaches the target opening degree K3 at last.

During the period from time T8 to time T10, as the actual opening degree (d) approaches the target opening degree K3, the opening degree deviation decreases, so that the operation amount (d) also decreases. Then, after time T10, the actual opening degree (d) almost coincides with the target opening degree K3, and the operation amount (d) again comes to stay around 0 [%] while the sign thereof is inverted.

In FIG. 12, the actual opening degree (d) comes to coincide with the target opening degree within a shorter time period than the predetermined time period TM3 from time T7 when the relaxation of the maximum value limitation was started. Therefore, the abnormality determination unit 407 does not determine that abnormality has occurred. In addition, in FIG. 12, the state in which the actual opening degree (d) does not coincide with the target opening degree has been eliminated without reaching determination that abnormality has occurred, and therefore, at time T10, the operation amount limitation relaxing unit 405 cancels the relaxation of the maximum value limitation by the second limit value L2 so as to return to the state in which the maximum value limitation by the first limit value L1 is performed, in order to prevent overheat from being caused by the actuator 34 continuing to be driven with the operation amount for which the maximum value limitation is relaxed.

As described above, in FIG. 11, while the actuator 34 is driven with the operation amount for which the maximum value limitation is performed, if a state in which the actual opening degree of the wastegate valve 31 does not coincide with the target opening degree has continued for a predetermined time period, driving for the actuator 34 is attempted with the operation amount for which the maximum value limitation is relaxed, and even after this, if the state in which the actual opening degree does not coincide with the target opening degree still has not been eliminated, it is determined that abnormality has occurred in the opening degree control system for the wastegate valve 31. Then, after it is determined that abnormality has occurred, the relaxation of the maximum value limitation for the operation amount is cancelled and the maximum value limitation by the first limit value L1 is restarted.

In FIG. 12, while the actuator 34 is driven with the operation amount for which maximum value limitation is performed, if a state in which the actual opening degree of the wastegate valve 31 does not coincide with the target opening degree has continued for a predetermined time period, driving for the actuator 34 is attempted with the operation amount for which the maximum value limitation is relaxed, and as a result, if the state in which the actual opening degree does not coincide with the target opening degree has been eliminated, the catching is regarded as being eliminated and it is determined that the opening degree control system for the wastegate valve 31 is normal. Thus, the relaxation of the maximum value limitation for the operation amount is cancelled and the maximum value limitation by the first limit value L1 is restarted.

Figure 13:
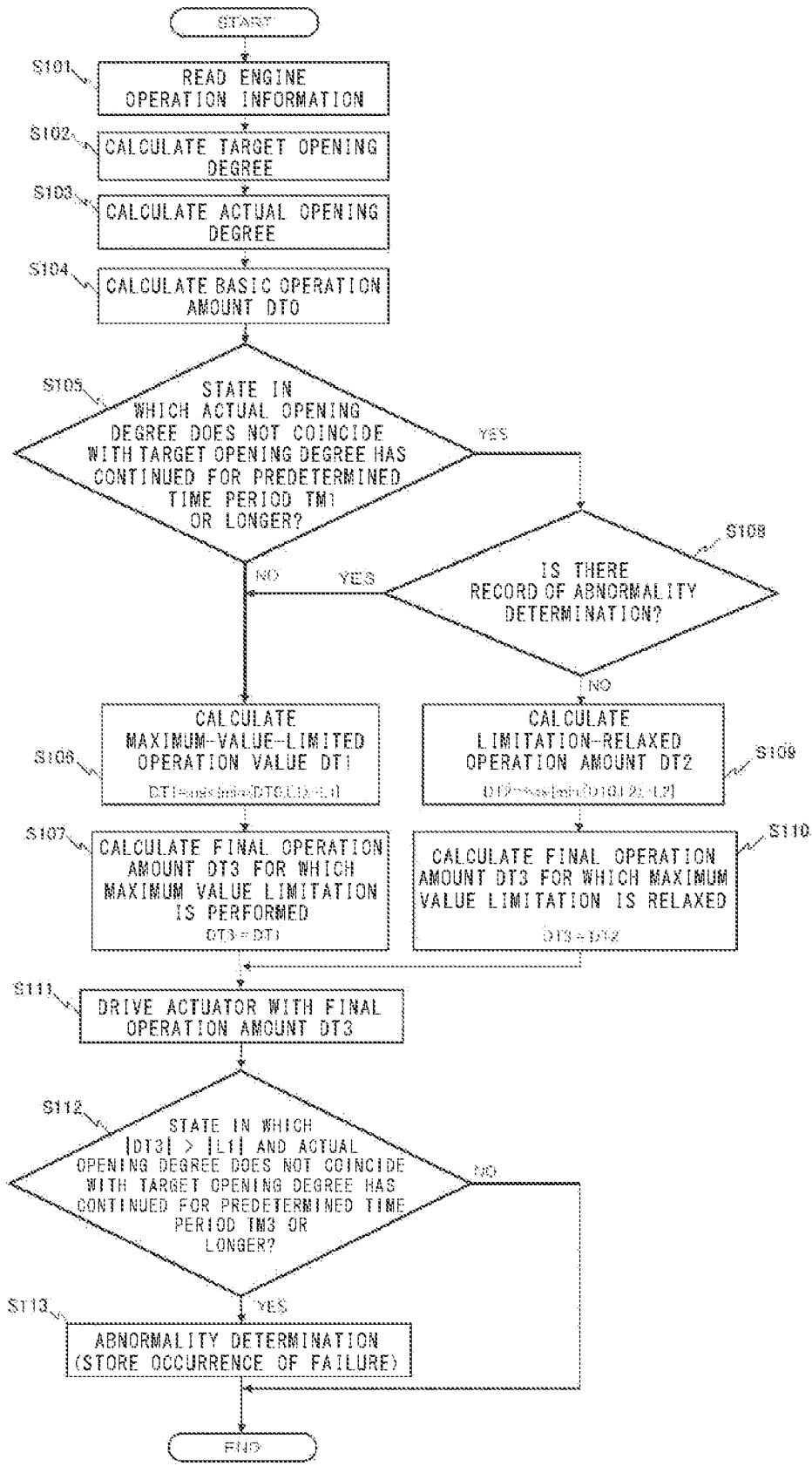
FIG. 13 is a flowchart illustrating a process by the control device according to the first embodiment.
Figure 14:
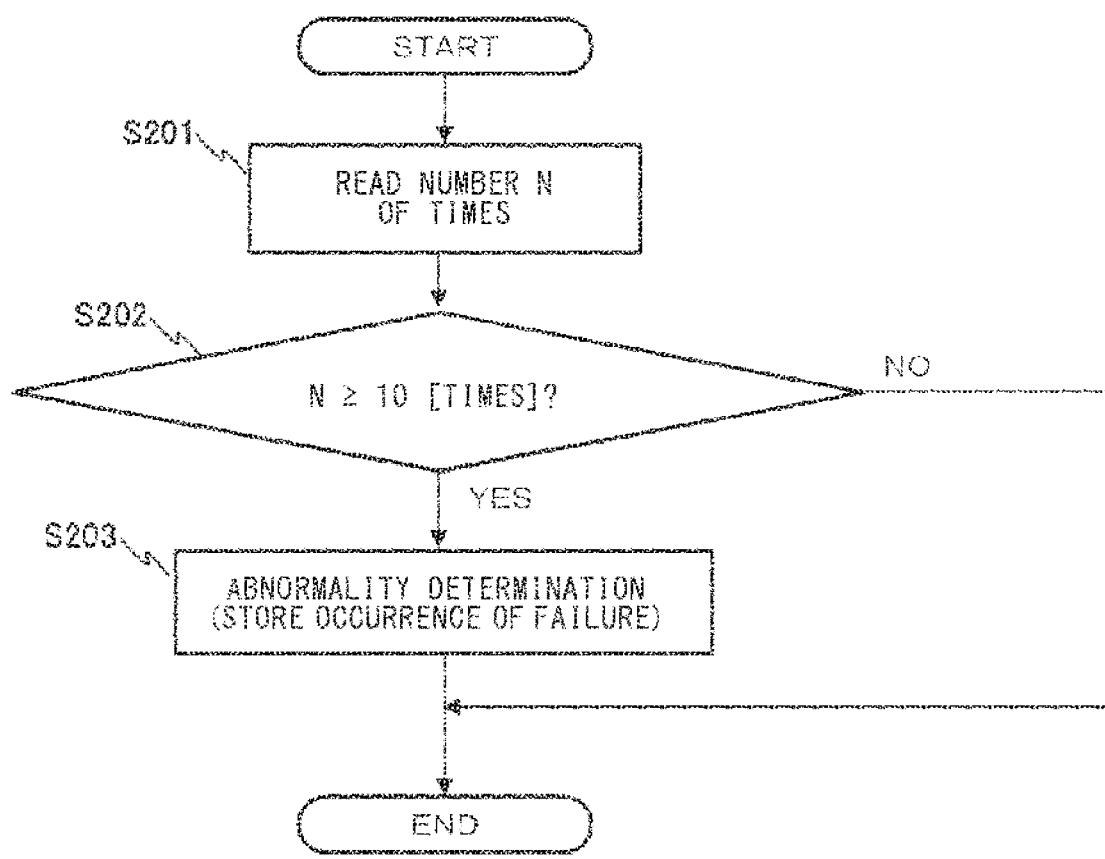
FIG. 14 is a flowchart illustrating a process by a control device according to the second embodiment.

The processes by the control units 401 to 407, etc., of the control device 40 according to the first embodiment are implemented as shown by flowcharts in FIG. 13 and FIG. 14. The flowchart processes shown in FIG. 13 and FIG. 14 are repeatedly executed, for example, every constant calculation cycle, by the calculation processing device 90 executing the software (program) stored in the storage device 91.

First, operation in the first embodiment will be described with reference to the flowchart shown in FIG. 13.

In step S101, various operation information about the internal combustion engine 10 is read. In the next step S102, the target opening degree calculation process is executed in which, of the engine operation information read in step S101, on the basis of various engine operation information such as the rotation speed of the internal combustion engine 10 detected by the crank angle sensor (not shown) as well as the amount of sucked air detected by the air flow sensor 41 and the boost pressure detected by the boost pressure sensor 42, an optimum required boost pressure is determined in accordance with the operation state of the internal combustion engine 10, and an opening degree of the wastegate valve 31 for achieving the required boost pressure is calculated as a target opening degree.

In step S103, the actual opening degree calculation process is executed in which the actual opening degree of the wastegate valve 31 is calculated on the basis of the actuated position of the wastegate valve 31 detected by the wastegate valve opening degree sensor 43, of the engine operation information read in step S101.

In step S104, the operation amount calculation process is executed in which the basic operation amount DT0 for the actuator 34 needed for causing the actual opening degree calculated in step S103 to approach the target opening degree calculated in step S102, is calculated. It is noted that, in the first embodiment, the basic operation amount DT0 (in this example, a value within a range from −100 [%] to +100 [%]) is calculated through feedback control such as PID calculation based on a deviation between the actual opening degree and the target opening degree.

In step S105, the target opening degree calculated in step S102 and the actual opening degree calculated in step S103 are compared with each other, and whether or not a state in which the actual opening degree does not coincide with the target opening degree has continued for the predetermined time period TM1 or longer is determined.

In step S105, if the state in which the actual opening degree does not coincide with the target opening degree has not continued for the predetermined time period TM1 or longer (case of NO), the process proceeds from step S105 to step S106. In step S106, the after-limitation-process operation amount DT1 (a value within a range from −L1 [%] to +L1 [%]) obtained by limiting the maximum value of the magnitude (absolute value) of the basic operation amount DT0 by the first limit value L1 [%], is calculated. In the next step S107, the after-limitation-process operation amount DT1 is set as the final operation amount DT3, and the process proceeds to step S111. In step S111, the actuator 34 is driven on the basis of the final operation amount DT3 under the operation amount limitation process.

In step S105, if the state in which the actual opening degree does not coincide with the target opening degree has continued for the predetermined time period TM1 or longer (case of YES), the process proceeds from step S105 to step S108.

In step S108, whether or not there is a record in which it is determined that abnormality has occurred in the past calculation cycles (whether or not failure has ever occurred) is determined. In step S108, if there is a record in which it is determined that abnormality has occurred (case of YES), the process proceeds from step S108 to step S106. In step S106, the after-limitation-process operation amount DT1 (a value within a range from −L1 [%] to +L1 [%]) obtained by limiting the magnitude (absolute value) of the basic operation amount DT0 by the first limit value L1 [%] is calculated. In the next step S107, the after-limitation-process operation amount DT1 is set as the final operation amount DT3, and the process proceeds to step S111.

On the other hand, in step S108, if there is no record in which it is determined that abnormality has occurred (case of NO), the process proceeds from step S108 to step S109. In step S109, the after-limitation-process-relaxation operation amount DT2 (a value within a range from −L2 [%] to +L2 [%], where L2 satisfies L1 [%]<L2 [%]≤100 [%]) is calculated which is obtained by limiting the maximum value of the basic operation amount DT0 by the second limit value L2 [%] which is set as such a value that relaxes the maximum value limitation as compared to the case of the first limit value L1 [%]. In the next step S110, the after-limitation-process-relaxation operation amount DT2 is set as the final operation amount DT3, and the process proceeds to step S111.

In step S111, the actuator driving process is executed in which the actuator 34 is driven with the final operation amount DT3 set by the operation amount limitation process being executed in one of the above step S107 and step S110, and the process proceeds to the next step S112.

In step S112, whether or not the maximum value limitation for the operation amount is relaxed is determined on the basis of whether or not the magnitude (absolute value) of the final operation amount DT3 is greater than the magnitude (absolute value) of the first limit value L1, and in addition, the actual opening degree is compared with the target opening degree and whether or not the state in which the actual opening degree does not coincide with the target opening degree has continued for the predetermined time period TM3 or longer is determined.

Then, in step S112, if the state in which the actual opening degree does not coincide with the target opening degree has continued for the predetermined time period TM3 or longer even though the maximum value limitation for the operation amount is relaxed (case of YES), the process proceeds from step S112 to step S113. In step S113, the abnormality determination process of determining that abnormality has occurred (storing occurrence of failure) is executed and the process is ended. On the other hand, if a result of the determination in step S112 is NO, the process is ended without determination that abnormality has occurred.

As described above, in the control device for the internal combustion engine according to the first embodiment, it is possible to suppress such an event that, in the case where, due to adherence of a foreign material to the connection mechanism 32 connecting the wastegate valve 31 and the actuator 34 or distortion of the movable member, the frictional resistance of the connection mechanism 32 increases and thus the follow-up property of the actual opening degree to the target opening degree is significantly reduced, even though the situation could be recovered by increasing the driving force of the actuator 34, the situation cannot be recovered because of limitation for the maximum value of the operation amount and thus determination that abnormality has occurred is easily reached.

Second Embodiment

Next, a control device for an internal combustion engine according to the second embodiment will be described with reference to a flowchart shown in FIG. 14.

The second embodiment relates to the following. That is, as shown in FIG. 12, driving for the actuator 34 is attempted with the operation amount for which the maximum value limitation is relaxed, whereby a state in which the actual opening degree does not coincide with the target opening degree is eliminated. However, if such a state sporadically occurs, this is determined to be a sign that abnormality will occur. Then, also in the case where it is confirmed that relaxation of the maximum value limitation for the operation amount has been executed a predetermined number of times or more while it is not determined that abnormality has occurred, it is determined that abnormality has occurred in the opening degree control system for the wastegate valve 31.

The operation of the flowchart shown in FIG. 14 is executed subsequently to the case where, in step S112 of the operation of the flowchart shown in FIG. 13 described above, a state in which the actual opening degree does not coincide with the target opening degree even though the maximum value limitation for the operation amount is relaxed has not continued for the predetermined time period TM3 or longer (case of NO), that is, the case where, while the maximum value limitation for the operation amount is relaxed, a state in which the actual opening degree does not coincide with the target opening degree is eliminated without reaching determination that abnormality has occurred in the opening degree control system for the wastegate valve.

In FIG. 14, in step S201, during operation of the internal combustion engine 10, a number N of times that, while the maximum value limitation for the operation amount is relaxed, the state in which the actual opening degree does not coincide with the target opening degree has been eliminated without reaching determination that abnormality has occurred, is read, and the process proceeds to step S202. In step S202, whether or not the above number N of times is equal to or greater than a predetermined number of times (for example, 10 [times]) is determined. In step S202, if N≥10 [times] is satisfied (case of YES), the process proceeds from step S202 to step S203. In step S203, as in step S113 in FIG. 13 described above, it is determined that abnormality has occurred (occurrence of failure is stored), and the process is ended. On the other hand, if a result of the determination in step S202 is NO, the process is ended without abnormality determination.

As described above, in the control device for the internal combustion engine according to the second embodiment, in the case where a state in which the actual opening degree of the wastegate valve 31 does not coincide with the target opening degree has continued, driving for the actuator 34 is attempted with the operation amount for which the maximum value limitation is relaxed, and then, even if the state in which the actual opening degree does not coincide with the target opening degree is eliminated, if such a state occurs a plurality of times (highly frequently), this is determined to be a sign that abnormality has occurred in the opening degree control system for the wastegate valve, and thus it is determined that abnormality has occurred.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 10 internal combustion engine
11 intake passage
15 exhaust passage
20 turbocharger
30 exhaust bypass passage
31 wastegate valve
34 actuator
40 control device
201 compressor
202 turbine
203 connection shaft
401 target opening degree calculation unit
402 actual opening degree calculation unit
403 operation amount calculation unit
404 operation amount limitation unit
405 operation amount limitation relaxing unit
406 actuator driving unit
407 abnormality determination unit
DT0 basic operation amount
DT1 after-limitation-process operation amount
DT2 after-limitation-process-relaxation operation amount
DT3 final operation amount
L1 first limit value
L2 second limit value

What is claimed is:

1. A control device for an internal combustion engine that includes: a turbocharger having a turbine provided to an exhaust passage of the internal combustion engine, and a compressor which is provided to an intake passage of the internal combustion engine and rotates integrally with the turbine; a wastegate valve which is provided to an exhaust bypass passage communicating an upstream side and a downstream side of the turbine with each other and adjusts a flow rate of exhaust gas flowing through the exhaust bypass passage; and an actuator which is connected with the wastegate valve and is driven for changing an actuated position of the wastegate valve, the control device comprising:

a target opening degree calculator to calculate a target opening degree for the wastegate valve on the basis of an operation state of the internal combustion engine;

an actual opening degree calculator to calculate an actual opening degree of the wastegate valve on the basis of the actuated position of the wastegate valve;

an operation amount calculator to calculate an operation amount for driving the actuator, on the basis of the target opening degree and the actual opening degree;

an actuator driver to drive the actuator on the basis of the operation amount;

an operation amount limiter to limit a maximum value of the operation amount to a predetermined value or lower; an operation amount limitation relaxer to relax the maximum value limitation for the operation amount if a state in which the actual opening degree does not coincide with the target opening degree has continued for a predetermined time period while the actuator is driven on the basis of the operation amount limited to the predetermined value or lower; and an abnormality determinator to determine that abnormality has occurred in an opening degree control system for the wastegate valve if the state in which the actual opening degree does not coincide with the target opening degree has not been eliminated even though the maximum value limitation for the operation amount is relaxed.

2. The control device for the internal combustion engine according to claim 1, wherein if the abnormality determinator determines that abnormality has occurred in the opening degree control system for the wastegate valve, the operation amount limitation relaxer cancels the relaxation of the maximum value limitation for the operation amount, so as to limit the maximum value of the operation amount to the predetermined value or lower again.

3. The control device for the internal combustion engine according to claim 1, wherein while the maximum value limitation for the operation amount is relaxed, if the state in which the actual opening degree does not coincide with the target opening degree has been eliminated without reaching determination that abnormality has occurred in the opening degree control system for the wastegate valve, the operation amount limitation relaxer cancels the relaxation of the maximum value limitation for the operation amount, so as to limit the maximum value of the operation amount to the predetermined value or lower again.

4. The control device for the internal combustion engine according to claim 2, wherein while the maximum value limitation for the operation amount is relaxed, if the state in which the actual opening degree does not coincide with the target opening degree has been eliminated without reaching determination that abnormality has occurred in the opening degree control system for the wastegate valve, the operation amount limitation relaxer cancels the relaxation of the maximum value limitation for the operation amount, so as to limit the maximum value of the operation amount to the predetermined value or lower again.

5. The control device for the internal combustion engine according to claim 3, wherein if a number of times that, while the maximum value limitation for the operation amount is relaxed, the state in which the actual opening degree does not coincide with the target opening degree has been eliminated without reaching determination that abnormality has occurred in the opening degree control system for the wastegate valve, has reached a predetermined number of times or more, the abnormality determinator determines that abnormality has occurred in the opening degree control system for the wastegate valve.

6. The control device for the internal combustion engine according to claim 4, wherein if a number of times that, while the maximum value limitation for the operation amount is relaxed, the state in which the actual opening degree does not coincide with the target opening degree has been eliminated without reaching determination that abnormality has occurred in the opening degree control system for the wastegate valve, has reached a predetermined number of times or more, the abnormality determinator determines that abnormality has occurred in the opening degree control system for the wastegate valve.

7. A control method for an internal combustion engine that includes: a turbocharger having a turbine provided to an exhaust passage of the internal combustion engine, and a compressor which is provided to an intake passage of the internal combustion engine and rotates integrally with the turbine; a wastegate valve which is provided to an exhaust bypass passage communicating an upstream side and a downstream side of the turbine with each other and adjusts a flow rate of exhaust gas flowing through the exhaust bypass passage; and an actuator which is connected with the wastegate valve and is driven for changing an actuated position of the wastegate valve, the control method executing:

a target opening degree calculation step of calculating a target opening degree for the wastegate valve on the basis of an operation state of the internal combustion engine;

an actual opening degree calculation step of calculating an actual opening degree of the wastegate valve on the basis of the actuated position of the wastegate valve;

an operation amount calculation step of calculating an operation amount for driving the actuator, on the basis of the target opening degree and the actual opening degree;

an actuator driving step of driving the actuator on the basis of the operation amount;

an operation amount limitation step of limiting a maximum value of the operation amount to a predetermined value or lower;

an operation amount limitation relaxing step of relaxing the maximum value limitation for the operation amount if a state in which the actual opening degree does not coincide with the target opening degree has continued for a predetermined time period while the actuator is driven on the basis of the operation amount limited to the predetermined value or lower; and an abnormality determination step of determining that abnormality has occurred in an opening degree control system for the wastegate valve if the state in which the actual opening degree does not coincide with the target opening degree has not been eliminated even though the maximum value limitation for the operation amount is relaxed.

* * * * *